US009819205B2

(12) United States Patent
Horii

(10) Patent No.: US 9,819,205 B2
(45) Date of Patent: Nov. 14, 2017

(54) WIRELESS DEVICE, DISPLAY CONTROL METHOD IN WIRELESS DEVICE AND NON-TRANSITORY COMPUTER READABLE RECORDING MEDIUM

(71) Applicant: KYOCERA CORPORATION, Kyoto (JP)

(72) Inventor: Yasuhiro Horii, Osaka (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/293,176

(22) Filed: Oct. 13, 2016

(65) Prior Publication Data

US 2017/0033581 A1 Feb. 2, 2017

Related U.S. Application Data

(63) Continuation of application No. PCT/JP2015/061979, filed on Apr. 20, 2015.

(30) Foreign Application Priority Data

| Apr. 18, 2014 | (JP) | ................................ 2014-086781 |
| Apr. 18, 2014 | (JP) | ................................ 2014-086782 |
| Apr. 18, 2014 | (JP) | ................................ 2014-086784 |

(51) Int. Cl.
*H02J 7/00* (2006.01)
*H02J 7/02* (2016.01)
(Continued)

(52) U.S. Cl.
CPC ............ *H02J 7/0047* (2013.01); *H02J 7/025* (2013.01); *H02J 50/10* (2016.02); *H02J 50/80* (2016.02);
(Continued)

(58) Field of Classification Search
CPC ................................ H02J 7/0047; H02J 50/10
See application file for complete search history.

(56) References Cited

U.S. PATENT DOCUMENTS

| 2012/0212178 | A1* | 8/2012 | Kim | ........................ | H02J 7/025 320/108 |
| 2014/0184171 | A1* | 7/2014 | Lee | ........................ | H02J 7/0055 320/138 |
| 2014/0300312 | A1 | 10/2014 | Akiyoshi et al. | | |

FOREIGN PATENT DOCUMENTS

| JP | 2008-131812 | 6/2008 |
| JP | 2011-078191 | 4/2011 |

(Continued)

OTHER PUBLICATIONS

Written Opinion of the International Searching Authority in International Application No. PCT/JP2015/061979, dated Jun. 30, 2015, and Statement of Relevance of non-English References in 5 pages.

(Continued)

*Primary Examiner* — Tuan H Nguyen
(74) *Attorney, Agent, or Firm* — Duane Morris LLP

(57) ABSTRACT

A wireless device and a display control method in a wireless device are disclosed. The wireless device is capable of making a call to another wireless device of a call partner and includes a first coil configured to generate an induced electromotive force by linking with magnetic flux from an external second coil, a battery configured to be supplied and charged with a charging current by the induced electromotive force, a wireless communication unit configured to wirelessly communicate with the wireless device of the call partner, a display, and at least one processor configured to communicate with the wireless device of the call partner via the wireless communication unit to perform call-related processing, and when a call is made during charging using the induced electromotive force, display charging informa- (Continued)

tion on the display The charging information includes information regarding a reduction in the charging current during the call.

12 Claims, 17 Drawing Sheets

(51) Int. Cl.
*H02J 50/10* (2016.01)
*H02J 50/80* (2016.01)
*H04B 5/00* (2006.01)
*H04M 1/02* (2006.01)

(52) U.S. Cl.
CPC ......... *H04B 5/0031* (2013.01); *H04B 5/0037* (2013.01); *H04B 5/0081* (2013.01); *H04M 1/0202* (2013.01); *H02J 7/0042* (2013.01); *H04M 2201/34* (2013.01); *H04M 2201/38* (2013.01)

(56) References Cited

FOREIGN PATENT DOCUMENTS

| JP | 2013-150533 | 8/2013 |
| JP | 2013-169027 A | 8/2013 |
| WO | WO 2013/046594 A1 | 4/2013 |

OTHER PUBLICATIONS

International Search Report in International Application No. PCT/JP2015/061979, dated Jun. 30, 2015 in 1 page.

Official Action dated Jun. 27, 2017 in counterpart Japanese Patent Application No. 2014-086781 with Statement of Relevance of Non-English References.

\* cited by examiner

FIG. 23

| | | | 800 MHz BAND | 1900 MHz BAND |
|---|---|---|---|---|
| RECEIPT CHECKING OPERATION | RECEPTION LEVEL > REFERENCE VALUE | SIGNAL LEVEL | — | REDUCE MAXIMUM VALUE OF TRANSMISSION LEVEL |
| | | CHARGING CURRENT | STOP CHARGING | SET CHARGING CURRENT TO VALUE THAT IMPROVES RECEIVING SENSITIVITY |
| | RECEPTION LEVEL < REFERENCE VALUE | SIGNAL LEVEL | — | REDUCE MAXIMUM VALUE OF TRANSMISSION LEVEL |
| | | CHARGING CURRENT | STOP CHARGING | SET CHARGING CURRENT TO VALUE THAT IMPROVES RECEIVING SENSITIVITY |
| DURING COMMUNICATION | RECEPTION LEVEL > REFERENCE VALUE | SIGNAL LEVEL | — | REDUCE MAXIMUM VALUE OF TRANSMISSION LEVEL |
| | | CHARGING CURRENT | NORMAL CHARGING | NORMAL CHARGING |
| | RECEPTION LEVEL < REFERENCE VALUE | SIGNAL LEVEL | — | REDUCE MAXIMUM VALUE OF TRANSMISSION LEVEL |
| | | CHARGING CURRENT | STOP CHARGING | SET CHARGING CURRENT TO VALUE THAT IMPROVES RECEIVING SENSITIVITY |

WIRELESS DEVICE, DISPLAY CONTROL METHOD IN WIRELESS DEVICE AND NON-TRANSITORY COMPUTER READABLE RECORDING MEDIUM

CROSS-REFERENCE TO RELATED APPLICATION

The present application is a continuation based on PCT Application No. PCT/JP2015/061979 filed on Apr. 20, 2015, entitled "WIRELESS DEVICE AND DISPLAY CONTROL METHOD IN WIRELESS DEVICE," which claims the benefit of Japanese Patent Application No. 2014-086781, filed on Apr. 18, 2014, entitled "WIRELESS DEVICE AND DISPLAY CONTROL METHOD IN WIRELESS DEVICE," Japanese Patent Application No. 2014-086782, filed on Apr. 18, 2014, entitled "WIRELESS DEVICE AND METHOD OF SETTING MAXIMUM VALUE OF TRANSMISSION LEVEL IN WIRELESS DEVICE," and Japanese Patent Application No. 2014-086784, filed on Apr. 18, 2014, entitled "WIRELESS DEVICE AND METHOD OF CONTROLLING CHARGING CURRENT IN WIRELESS DEVICE," the contents of which are incorporated by reference herein in their entirety.

FIELD

Embodiments of the present disclosure relate to wireless devices, display control methods in wireless devices and a non-transitory computer readable recording medium.

BACKGROUND

Various techniques have conventionally been proposed for communication terminals provided with coils. An induced electromotive force generated in a first coil is used to charge a battery. This induced electromotive force in the first coil is generated by linking the first coil with magnetic flux from a second coil of an external battery charger.

SUMMARY

A wireless device, a display control method in a wireless device and a non-transitory computer readable recording medium are disclosed. In one embodiment, a wireless device is a wireless device capable of making a call to another wireless device of a call partner. The wireless device includes a first coil, a battery, a wireless communication unit, a display, and at least one processor. The first coil is configured to generate an induced electromotive force by linking with magnetic flux from an external second coil. The battery is configured to be supplied and charged with a charging current by the induced electromotive force. The wireless communication unit is configured to wirelessly communicate with the wireless device of the call partner. The at least one processor is configured to communicate with the wireless device of the call partner via the wireless communication unit to perform call-related processing, and when a call is made during charging using the induced electromotive force, display charging information on the display. The charging information includes information regarding a reduction in the charging current during the call.

In one embodiment, a display control method in a wireless device is a method of controlling display on a display of a wireless device. The wireless device is capable of making a call to another wireless device of a call partner and includes a first coil, a battery, a wireless communication unit, and a display. The first coil is configured to generate an induced electromotive force by linking with magnetic flux from an external second coil. The battery is configured to be supplied and charged with a charging current by the induced electromotive force. The wireless communication unit is configured to wirelessly communicate with the wireless device of the call partner. The method includes communicating with a wireless terminal of the call partner via the wireless communication unit to perform call-related processing, and displaying charging information on the display when a call is made during charging using the induced electromotive force. The charging information includes information regarding a reduction in the charging current during the call.

In one embodiment, a non-transitory computer readable recording medium that stores a control program for controlling a wireless device. The control program causes the wireless device to execute first to third step. In the first step, communication with a wireless device of a call partner is made to perform call-related processing. In the second step an induced electromotive force by linking a first coil of the wireless device with magnetic flux from an external second coil is generated and a charging current is supplied to a battery of the wireless device by the induced electromotive force to charge the battery. In the third step, charging information is displayed on a display of the wireless device when the call-related processing is performed during charging using the induced electromotive force. The charging information includes information regarding a reduction in the charging current during a call.

BRIEF DESCRIPTION OF THE DRAWINGS

FIG. 23 illustrates control of transmission level and control of charging current.

DETAILED DESCRIPTION

First Embodiment

Overall Configuration

Figure 1:
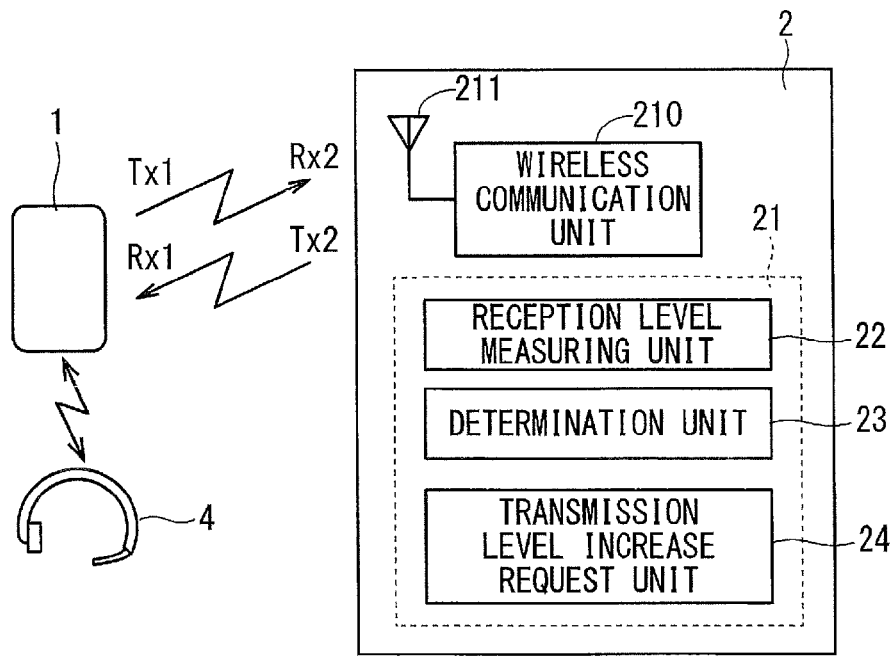
FIG. 1 illustrates an example conceptual configuration of a wireless communication system.

FIG. 1 illustrates an example conceptual configuration of a wireless communication system. The wireless communication system includes a base station 2 that is one example of an external device, and a wireless device (e.g., portable wireless terminal) 1. The portable wireless terminal 1 is operated by a user. The portable wireless terminal 1 is capable of wireless communication with the base station 2. The portable wireless terminal 1 transmits a transmission signal Tx1 to the base station 2, and the base station 2 receives this signal as a received signal Rx2. The base station 2 transmits a transmission signal Tx2 to the portable wireless terminal 1, and the portable wireless terminal 1 receives this signal as a received signal Rx1.

The portable wireless terminal 1 may be a mobile phone such as a smartphone, or a portable information terminal such as a personal digital assistance (PDA) or a tablet. The base station 2 can relay communication between the portable wireless terminal 1 and a higher level network (e.g., telephone network or the Internet) or another base station. Thus, the base station 2 can also relay communication between different portable wireless terminals 1.

Base Station

The base station 2 includes a wireless communication unit 210 and a controller 21. The wireless communication unit 210 includes an antenna 211. The wireless communication unit 210 can transmit the transmission signal Tx2 to the portable wireless terminal 1 via the antenna 211 and receive the received signal Rx2 from the portable wireless terminal 1 via the antenna 211.

The controller 21 can perform overall control of the base station 2. The controller 21 includes, for example, a processor such as a CPU and a storage such as a memory. The storage can store programs for controlling the base station 2, and the processor can execute the programs to control the base station 2.

For example, the controller 21 can generate the transmission signal Tx2 and transmit the transmission signal Tx2 to the portable wireless terminal 1 via the wireless communication unit 210 and the antenna 211. The controller 21 can also analyze the received signal Rx2 received via the antenna 211 and the wireless communication unit 210 and perform control in accordance with the content of the signal.

As illustrated in FIG. 1, the controller 21 includes a reception level measuring unit 22, a reception level determination unit 23, and a transmission level increase request unit 24. Note that these functions may be implemented by the controller 21 executing programs, or some or all of the functions may be implemented by hardware.

Figure 2:
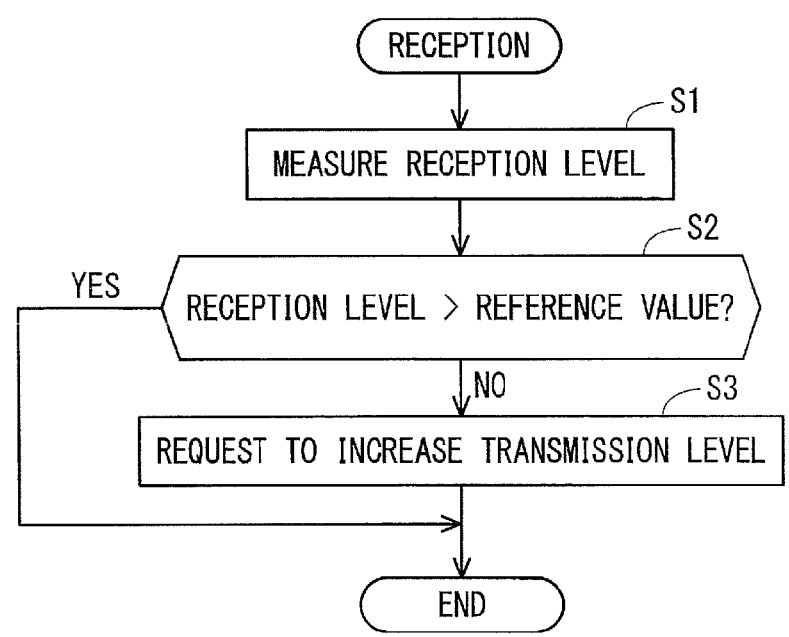
FIG. 2 illustrates a flowchart showing an example of operations of a base station.

FIG. 2 illustrates an example of operations of the controller 21. In step S1, the reception level measuring unit 22 receives input of the received signal Rx2 and measures the reception level (power value) of the received signal. Next, in step S2, the reception level determination unit 23 determines whether the reception level is higher than a reference value. This determination may be made using a comparator. The reference value may be a value of the reception level (receiving sensitivity) that is necessary to analyze the received signal Rx2. Thus, a reception level lower than the reference value makes proper analysis difficult.

When it is determined in step S2 that the reception level is lower than the reference value, the transmission level increase request unit 24 requests the portable wireless terminal 1 to increase the transmission level of the transmission signal Tx1 in step S3. More specifically, the transmission level increase request unit 24 adds a request signal for requesting an increase in the transmission level to the transmission signal Tx2, and transmits the resultant transmission signal Tx2 to the portable wireless terminal 1 via the antenna 211 and the wireless communication unit 210. This request signal may also include the amount of increase in the transmission level.

In the following description, the process of adding a predetermined signal to the transmission signal Tx2 and transmitting the transmission signal Tx2 via the antenna 211 and the wireless communication unit 210 may also be simply expressed as transmitting the signal. Similarly, a process of receiving a predetermined signal included in the received signal Rx2 via the antenna 211 and the wireless communication unit 210 may be simply expressed as receiving the signal. The same applies to the portable wireless terminal 1.

When this request signal is received, the portable wireless terminal 1 increases the transmission level (power value) of the transmission signal Tx1 in accordance with the request signal. When the request signal includes the amount of increase, the transmission level is increased by that amount of increase. In this case, the transmission signal Tx1 is transmitted at a higher transmission level, and accordingly the reception level of the received signal Rx2 received by the base station 2 increases. Thus, the received signal Rx2 can be received at an appropriate reception level.

On the other hand, when it is determined in step S2 that the reception level is higher than the reference value, the processing ends without performing step S3. That is, the request signal is not transmitted when the reception level is sufficiently high. This avoids an increase in the power consumption of the portable wireless terminal 1, because power consumption increases due to the transmission signal Tx1 being transmitted at a high transmission level.

Portable Wireless Terminal

Figure 3:
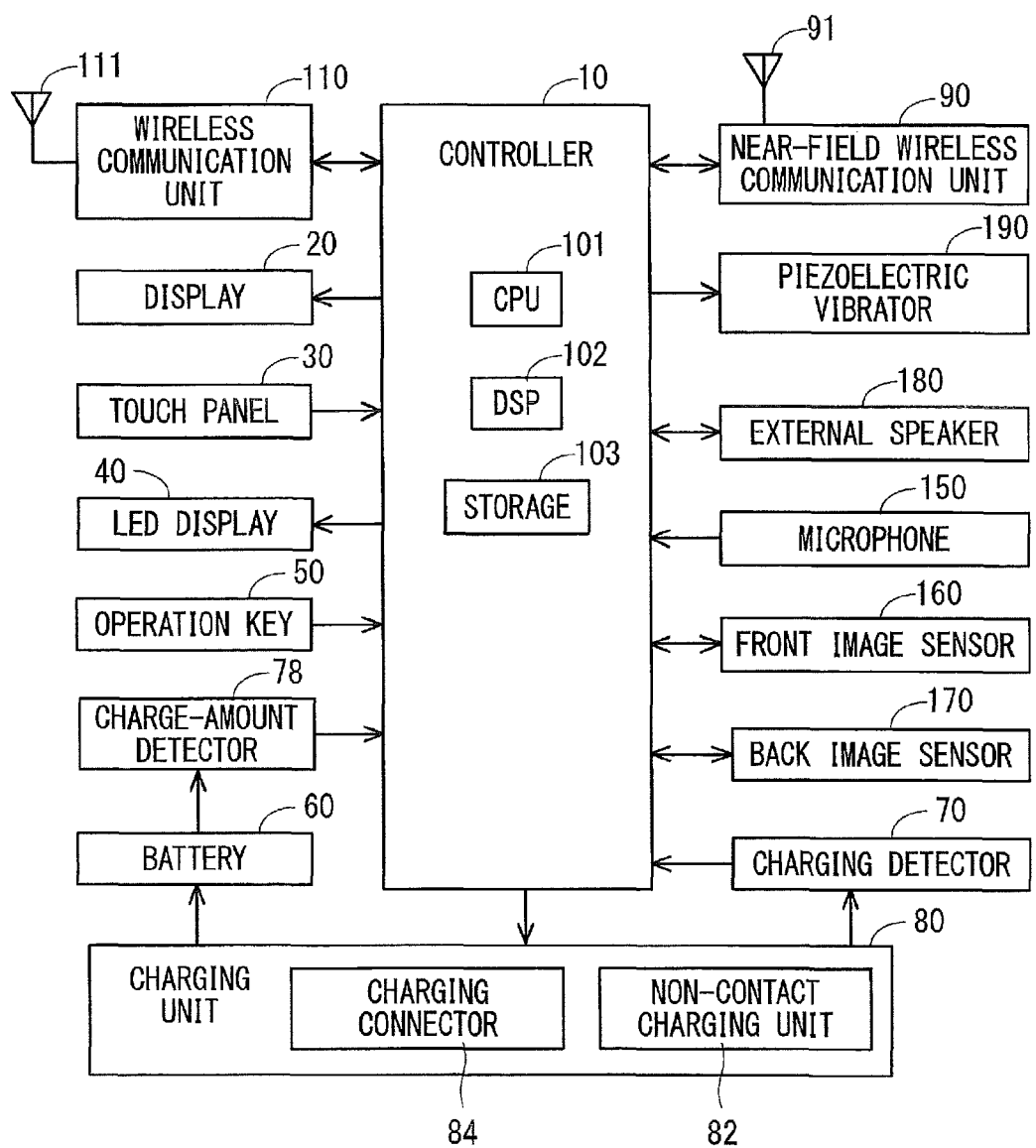
FIG. 3 illustrates a block diagram schematically showing an example electrical configuration of the wireless device.

FIG. 3 illustrates a block diagram schematically showing an example electrical configuration of the portable wireless terminal 1. As illustrated in FIG. 3, the portable wireless terminal 1 includes a controller 10, a wireless communication unit 110, a display 20, a touch panel 30, an LED display 40, an operation key 50, a battery 60, a charging detector 70, a charge-amount detector 78, a charging unit 80, a microphone 150, a front image sensor 160, a back image sensor 170, a speaker 180, a piezoelectric vibrator 190, and a near-field wireless communication unit 90. These constituent elements of the portable wireless terminal 1 are housed in a casing of the portable wireless terminal 1.

The controller 10 includes, for example, a central processing unit (CPU) 101, a digital signal processor (DSP) 102, and a storage 103. The controller 10 can perform overall management of the operations of the portable wireless terminal 1 by controlling the other constituent elements of the portable wireless terminal 1. The storage 103 includes, for example, a read only memory (ROM) and a random access memory (RAM). The storage 103 can store programs such as a main program that is a control program for controlling the portable wireless terminal 1, specifically, controlling the constituent elements of the portable wireless terminal 1 including the wireless communication unit 110 and the display 20, and a plurality of application programs (e.g., programs for calls, e-mails, and the Internet). Various functions of the controller 10 are implemented by the CPU 101 and the DSP 102 executing various programs stored in the storage 103.

The wireless communication unit 110 includes an antenna 111. The wireless communication unit 110 can transmit and receive communication signals to and from another portable wireless terminal different from the portable wireless terminal 1 or a communication device such as a web base station connected to the Internet, via the base station and using the antenna 111.

The near-field wireless communication unit 90 includes an antenna 91. The near-field wireless communication unit 90 can communicate with a communication terminal that is at a closer location than the communication target (base station 2) of the wireless communication unit 110. The near-field wireless communication unit 90 establishes communication in compliance with standards such as Bluetooth (registered trademark).

For example, a method of establishing communication using a head set 4 (FIG. 1) is conceivable as a method using the near-field wireless communication. The portable wireless terminal 1 communicates with the head set 4 via the near-field wireless communication unit 90 and the antenna 91.

The head set 4 includes an earphone, a microphone, an operation unit, and a near-field wireless communication unit and can be worn by a user. The portable wireless terminal 1 receives an audio signal from another portable wireless terminal 1 of a call partner via the base station 2 and transmits the received audio signal to the head set 4. The head set 4 converts this audio signal into sound with the earphone and outputs the sound. The sound uttered by the user is converted into an audio signal by the microphone of the head set 4, and this audio signal is transmitted to the portable wireless terminal 1. The portable wireless terminal 1 transmits this audio signal to the portable wireless terminal of the call partner via the base station 2. When the user inputs a command to answer or terminate a call via the operation unit of the head set 4, this information is transmitted to the portable wireless terminal 1. In this way, the user is able to make a call, using the head set 4. Since the user wears the head set 4, he or she does not need to hold either the portable wireless terminal 1 or the head set 4, and both of his or her hands are free.

The display 20 may be a liquid crystal display or an organic EL display. Various types of information displayed by the display 20 is visually recognizable from outside via a display area of the portable wireless terminal 1.

The touch panel 30 is, for example, a projection capacitive touch panel and arranged facing the display 20. The touch panel 30 includes two sheet-like electrode sensors that are arranged facing each other. When the user touches the display area with an operator element such as his or her finger, the electrostatic capacity changes in a portion of the touch panel 30 that opposes the operator element. Then, the touch panel 30 outputs to the controller 10 an electrical signal that depends on the change in electrostatic capacity. In this way, the touch panel 30 can detect contact of the operator element with the display area.

The operation key 50 can output an electrical instruction signal to the controller 10 by being pressed. The operation key 50 and the touch panel 30 are common in that they receive input of an operation made on the portable wireless terminal 1.

The speaker 180 can provide a sound such as a ring tone to the user who is away from the portable wireless terminal 1 by converting an electrical sound signal inputted from the controller 10 into sound and outputting the sound.

The microphone 150 and the piezoelectric vibrator 190 are used for a call, for example. The "call" as used herein refers to a form of call that is different from the call using the head set 4. In one example, the user makes a call while bringing the microphone 150 close to his or her mouth and the piezoelectric vibrator 190 close to his or her ear. The microphone 150 can receive input of a sound such as the user's voice during a call or other operation, convert the input sound such as a voice into an electrical signal, and output the electrical signal to the controller 10.

The piezoelectric vibrator 190 is caused to vibrate by a driving voltage applied from the controller 10. The controller 10 can generate the driving voltage on the basis of the sound signal and apply the driving voltage to the piezoelectric vibrator 190. As a result of the controller 10 causing the piezoelectric vibrator 190 to vibrate on the basis of the sound signal, the portable wireless terminal 1 (to be more specific, the surface of the portable wireless terminal that is close to the user's ear) vibrates on the basis of the sound signal, and consequently the received sound is transmitted to the user. The volume of this sound is set to a value that can be heard properly when the user brings his or her ear close to the portable wireless terminal 1.

While the illustration in FIG. 3 takes the example of the case where the piezoelectric vibrator 190 is used to transmit a received sound to the user, the piezoelectric vibrator 190 may be replaced by a dynamic loudspeaker that converts an electrical sound signal from the controller 10 into sound and outputs the sound. In the case of using the dynamic loudspeaker, a receiver hole is located on the portable wireless terminal 1. The sound output from the dynamic speaker is output from the receiver hole to the outside. The volume of the sound output from the receiver hole is lower than the volume of the sound output from the speaker 180.

The LED display 40 includes a light emitting device (e.g., light-emitting diode (LED)), and the controller 10 controls light emission of the LED. For example, when the battery 60 (described later) is being charged or when there is an unanswered incoming call or unread e-mail, the LED display 40 can emit light to give notification to the user.

The front image sensor 160 and the back image sensor 170 can capture still images and moving images. The back image sensor 170 is provided on the back side of the portable wireless terminal 1.

The battery 60 can function as the operating power supply of the portable wireless terminal 1. The battery 60 can provide direct-current power to the constituent elements (constituent elements illustrated in FIG. 3) of the portable wireless terminal 1 that require power.

The charge-amount detector 78 can detect the amount of charge accumulated in the battery 60 and output this amount of charge to the controller 10. The controller 10 can, for example, cause display 20 to display the amount of charge in the battery 60 (remaining battery capacity).

The charging unit 80 can receive electric power from an external battery charger and use this power to charge the battery 60. More specifically, the charging unit 80 includes a non-contact charging unit 82 and a charging connector (connection unit) 84. As will be described later, the non-contact charging unit 82 and the charging connector 84 can respectively receive electric power from a non-contact battery charger and a direct-contact battery charger and each can charge the battery 60. The controller 10 can select one of the non-contact charging unit 82 and the charging connector 84 and use the selected unit to charge the battery 60.

The charging detector 70 can detect whether the charging unit 80 is receiving electric power from the battery charger. More specifically, the charging detector 70 can detect whether the non-contact charging unit 82 is receiving electric power from the non-contact battery charger and whether the charging connector 84 is receiving electric power from the direct-contact battery charger. The detection results are input to the controller 10.

In response to the detection results obtained by the charging detector 70, the controller 10 can select one of the non-contact charging unit 82 and the charging connector 84 and use the selected unit to charge the battery 60.

Charging

Figure 4:
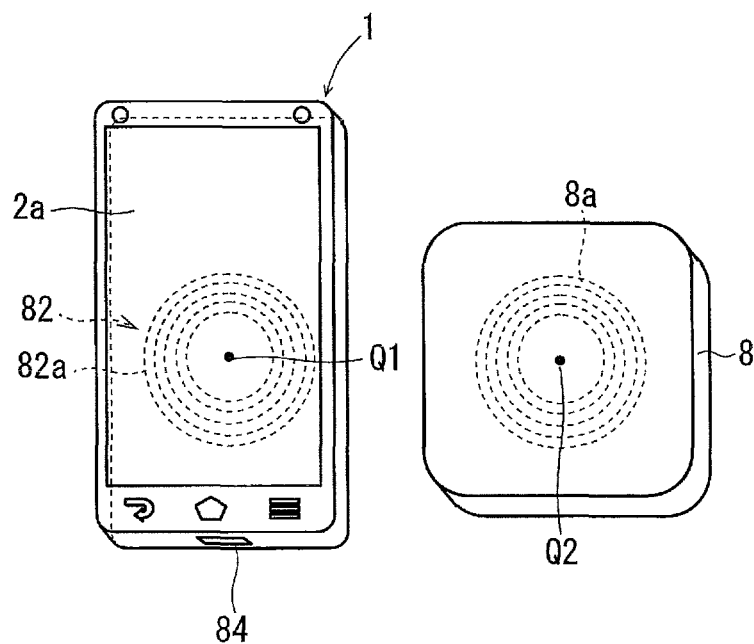
FIG. 4 illustrates non-contact charging.
Figure 5:
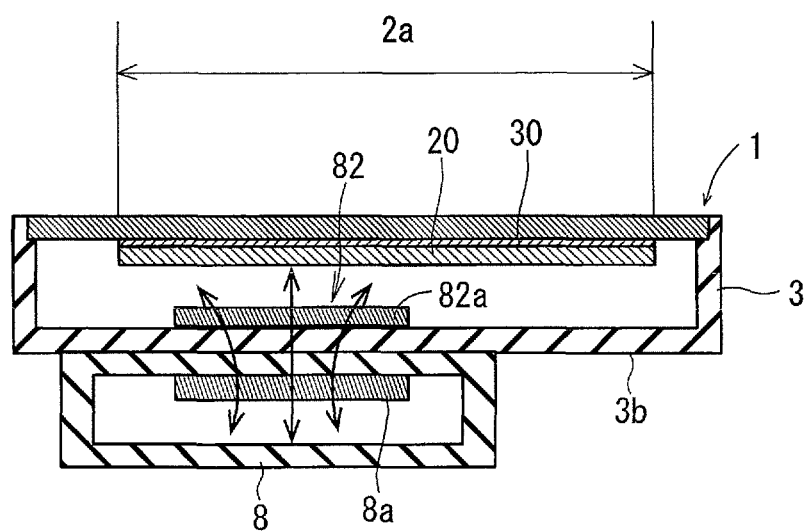
FIG. 5 illustrates a cross-sectional view schematically showing an example of the wireless device and a non-contact battery charger.
Figure 6:
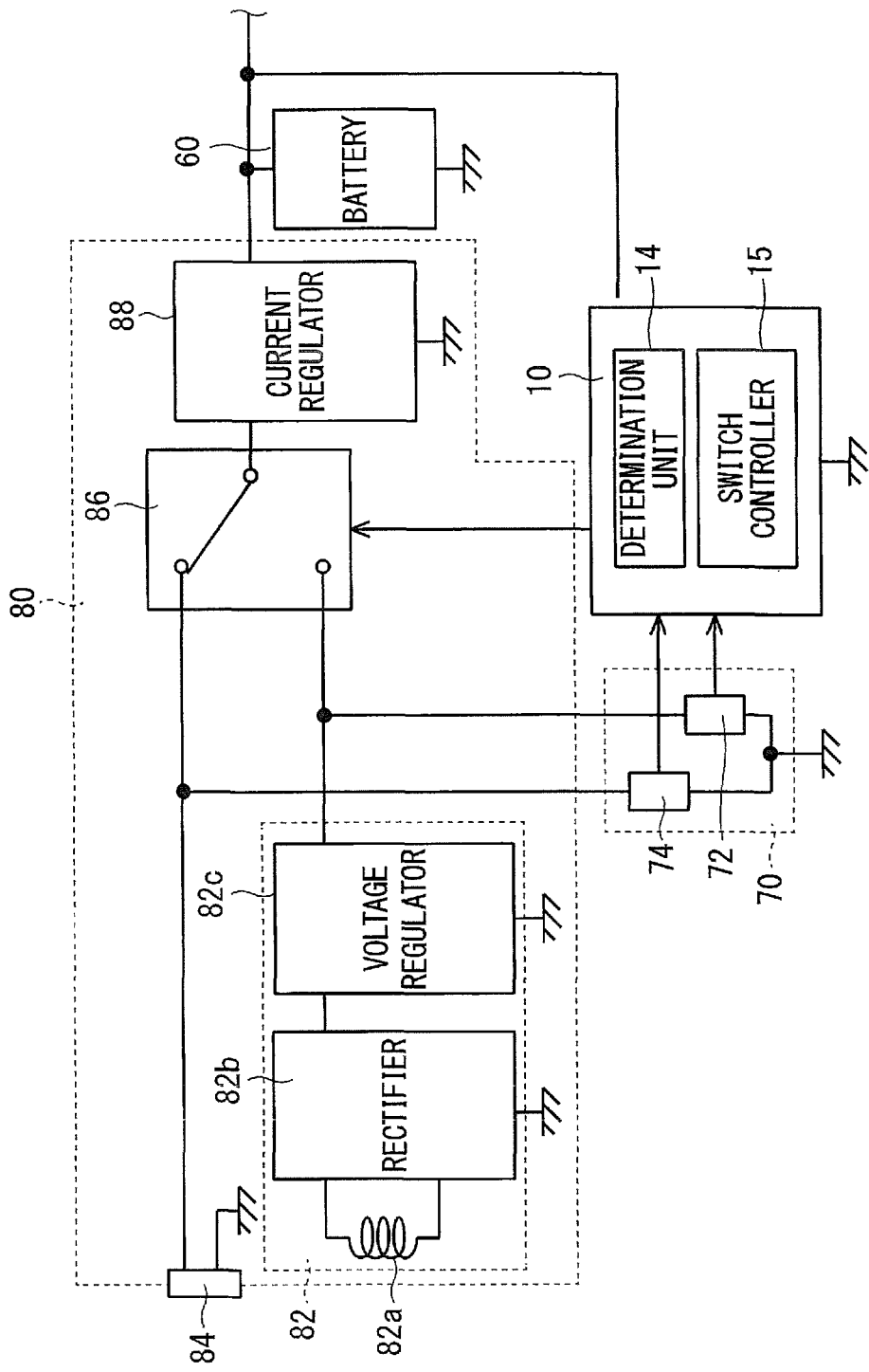
FIG. 6 illustrates a block diagram schematically showing example internal configurations of a charger and a charging detector.

The following describes the charging of the battery 60 via the non-contact charging unit 82 with reference to FIGS. 4 and 5, and also describes a specific example of the internal configurations of the charging unit 80 and the charging detector 70 with reference to FIG. 6.

FIG. 4 illustrates a perspective view showing an example of the portable wireless terminal 1 and the non-contact battery charger 8. The portable wireless terminal 1 has, for example, a flat plate-like shape. The portable wireless terminal 1 has a display area 2a on the front side.

The non-contact charging unit 82 includes a charging coil 82a. The charging coil 82a includes a conductor that is wound around a predetermined winding axis, and the winding axis is arranged in a position generally orthogonal to the display area 2a.

The non-contact battery charger 8 has, for example, a generally flat plate-like shape and internally includes a battery charger coil 8a. The battery charger coil 8a includes a conductor that is wound around a predetermined winding axis, and the winding axis is arranged in a position generally orthogonal to the main surface of the non-contact battery charger 8. The non-contact battery charger 8 is connected to a power source (not shown) and can use the power source to flow current (e.g., alternating current) through the battery charger coil 8a. In this way, the battery charger coil 8a can generate a magnetic field (e.g., alternating field).

The user places the portable wireless terminal 1 on the main surface of the non-contact battery charger 8 such that the charging coil 82a faces the battery charger coil 8a. FIG. 5 conceptually illustrates example cross sections of the portable wireless terminal 1 and the non-contact battery charger 8 when the portable wireless terminal 1 is placed on the main surface of the non-contact battery charger 8. In this state, the magnetic flux generated through the battery charger coil 8a links with the charging coil 82a. This produces an induced electromotive force in the charging coil 82a. That is, the charging coil 82a generates an induced electromotive force when the magnetic flux is received from the battery charger coil 8a. This induced electromotive force is an alternating voltage. As will be described later, the non-contact charging unit 82 rectifies this induced electromotive force to charge the battery 60.

As described above, the non-contact charging unit 82 receives electric power through the magnetic connection with the non-contact battery charger 8 and charges the battery 60. That is, an electrical connection between the portable wireless terminal 1 and the non-contact battery charger 8 is unnecessary for this charging. Thus, this charging method is called "non-contact charging" or "wireless charging." This charging method is also called "electromagnetic induction charging" because charging is implemented using electromagnetic induction.

In order to improve the efficiency (transmission efficiency) of the charging coil 82a receiving electric power from the battery charger coil 8a, the non-contact charging unit 82 may include a magnetic sheet (not shown). The transmission efficiency as used herein refers to the ratio of the electric power of the charging coil 82a to the electric power of the battery charger coil 8a. The magnetic sheet is made of a material having higher magnetic permeability than air. The charging coil 82a is provided on one surface of the magnetic sheet, with its winding axis arranged in a position generally orthogonal to the magnetic sheet. The magnetic sheet with high magnetic permeability can increase the amount of magnetic flux and accordingly increase the induced electromotive force in the charging coil 82a. Conversely, the magnetic sheet can reduce the electric power of the battery charger coil 8a that is required to generate a voltage necessary for the charging coil 82a. The presence of the magnetic sheet can also suppress leakage of the magnetic flux through the charging coil 82a to the outside.

In the illustration in FIG. 5, the portable wireless terminal 1 is placed on the non-contact battery charger 8, with a rear surface 3b of the portable wireless terminal 1 facing the non-contact battery charger 8. Thus, in the illustration in FIG. 4, the charging coil 82a may be attached to the rear surface 3b side of a casing 3 of the portable wireless terminal 1. This allows the charging coil 82a to be brought close to the battery charger coil 8a. By reducing the distance between the charging coil 82a and the battery charger coil 8a in this way, it is possible to increase the amount of magnetic flux that effectively links with the charging coil 82a. This increases the magnitude of the induced electromotive force in the charging coil 82a and accordingly improves the transmission efficiency.

If a center Q1 of the charging coil 82a deviates from a center Q2 of the battery charger coil 8a in a plan view, the amount of magnetic flux that effectively links with the charging coil 82a decreases in accordance with the amount of deviation (distance). That is, the induced electromotive force generated in the charging coil 82a decreases as this distance increases. In this case, the transmission efficiency is reduced. Thus, it is desirable for the user to place the portable wireless terminal 1 such that the distance between the center Q1 of the charging coil 82a and the center Q2 of the battery charger coil 8a is short in a plan view.

In the illustration in FIG. 4, the charging connector 84 is also shown. The charging connector 84 is located, for example, in a side surface of the portable wireless terminal 1. When this charging connector 84 is electrically connected to a direct-contact battery charger (not shown), direct-current voltage is applied from the direct-contact battery charger to the charging connector 84. The direct-contact battery charger includes an AC/DC adaptor. The AC/DC adaptor receives alternating voltage from the outside, converts this alternating voltage into appropriate direct-current voltage, and applies this direct-current voltage to the charging connector 84.

FIG. 6 illustrates a block diagram showing a specific example of internal configurations of the charging unit 80 and the charging detector 70. The charging unit 80 includes, for example, the charging connector 84, the non-contact charging unit 82, a selector 86, and a current regulator 88. The non-contact charging unit 82 includes the charging coil 82a, a rectifier 82b, and a voltage regulator 82c. The charging coil 82a receives a magnetic field from the non-contact battery charger 8 and generates an induced electromotive force as described above. The induced electromotive force (alternating voltage) is input from the charging coil 82a to the rectifier 82b. The rectifier 82b rectifies the induced electromotive force and inputs the rectified direct-current voltage to the voltage regulator 82c. The voltage regulator 82c is, for example, a constant-voltage circuit and outputs stable direct-current voltage.

The selector 86 can select one of the voltage from the charging connector 84 and the induced electromotive force from the charging coil 82a and use the selected voltage or force to charge the battery 60 under the control of the controller 10. The selector 86 is, for example, a switch and can select one of the voltage of the charging connector 84 and the output voltage of the non-contact charging unit 82 and input the selected voltage to the current regulator 88.

The output of the current regulator 88 is connected to the battery 60. The current regulator 88 can adjust and output the output current.

The charging detector 70 includes, for example, voltage detectors 72 and 74. The voltage detector 72 can detect the output voltage of the non-contact charging unit 82 and output the detection result to the controller 10. The voltage detector 74 can detect the voltage of the charging connector 84 and output the detection result to the controller 10. When the output voltage of the non-contact charging unit 82 is greater than a voltage reference value, it can be determined that the non-contact charging unit 82 is receiving voltage from the non-contact battery charger 8. Similarly, when the voltage of the charging connector 84 is greater than the voltage reference value, it can be determined that the charging connector 84 is receiving voltage from the direct-contact battery charger.

The controller 10 includes a determination unit 14 and a switch controller 15. The determination unit 14 and the switch controller 15 may be implemented by the controller 10 executing programs, or part or all of the determination unit 14 and the switch controller 15 may be implemented by hardware. The same applies to various functions of the controller 10, which will be described later, and redundant descriptions thereof will be omitted in the following description.

The determination unit 14 can determine whether the output voltages of the non-contact charging unit 82 and the charging connector 84 are each greater than the voltage reference value. The switch controller 15 can control the selector 86 in accordance with the determination result obtained by the determination unit 14. More specifically, when the voltage of the charging connector 84 is greater than the voltage reference value and the output voltage of the non-contact charging unit 82 is smaller than the voltage reference value, the controller 10 controls the selector 86 such that the voltage of the charging connector 84 is input to the current regulator 88. That is, in this case, it is determined that the non-contact battery charger 8 is not used and the voltage from the direct-contact battery charger is input to the charging connector 84, and therefore the battery 60 is charged with the voltage of the charging connector 84.

On the other hand, when the voltage of the charging connector 84 is smaller than the voltage reference value and the output voltage of the non-contact charging unit 82 is greater than the voltage reference value, the controller 10 controls the selector 86 such that the output voltage of the non-contact charging unit 82 is input to the current regulator 88. That is, in this case, it is determined that the direct-contact battery charger is not used and the portable wireless terminal 1 is placed on the non-contact battery charger 8, and therefore the battery 60 is charged with the induced electromotive force in the charging coil 82a.

When the voltage of the charging connector 84 and the output voltage of the non-contact charging unit 82 are both greater than the voltage reference value, the controller 10 controls the selector 86, for example, such that the battery 60 is charged with the voltage of the charging connector 84. That is, when both of the direct-contact battery charger and the non-contact battery charger 8 are used, the direct-contact battery charger is preferentially used, for example.

Note that the non-contact charging unit 82 is capable of near-field wireless communication with the non-contact battery charger 8. This communication allows the non-contact battery charger 8 to recognize whether the portable wireless terminal 1 is placed on the non-contact battery charger 8 and whether the portable wireless terminal 1 is detached from the non-contact battery charger 8. When the direct-contact battery charger is connected to the charging connector 84 while the portable wireless terminal 1 is placed on the non-contact battery charger 8, the non-contact charging unit 82 may transmit a signal for ending the non-contact charging to the non-contact battery charger 8. When this signal is received, the non-contact battery charger 8 ends the application of alternating voltage to the battery charger coil 8a. This avoids unnecessary power consumption by the non-contact battery charger 8.

Communication with Base Station

The controller 10 can generate the transmission signal Tx1 and transmit the transmission signal Tx1 to the base station 2 via the wireless communication unit 110 and the antenna 111. The controller 10 can also receive the received signal Rx1 via the antenna 111 and the wireless communication unit 110 and analyze the received signal Rx1. The controller 10 can control the portable wireless terminal 1 in accordance with the content of the received signal Rx1.

Figure 7:
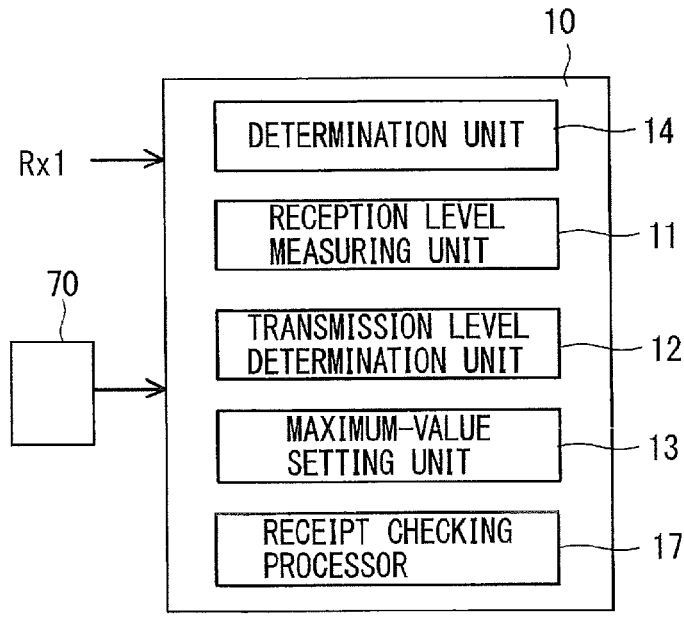
FIG. 7 illustrates an example conceptual configuration of a controller of the wireless device.

The controller 10 further includes the determination unit 14, a reception level measuring unit 11, a transmission level determination unit 12, a maximum value setting unit 13, and a receipt checking processor 17, as illustrated in FIG. 7. The determination unit 14 is as described above.

The reception level measuring unit 11 can receive input of the received signal Rx1 and measure the reception level of the received signal Rx1. The transmission level determination unit 12 can determine the initial value of the transmission level of the transmission signal Tx1 on the basis of the reception level of the received signal Rx1. More specifically, it is possible to determine the initial value of the transmission level of the transmission signal Tx1 to be a greater value as the reception level of the received signal Rx1 becomes lower. This is because of the following reason.

That is, a low reception level of the received signal Rx1 indicates that the transmission signal Tx2 transmitted from the base station 2 has lost a large amount of electric power before reaching the portable wireless terminal 1. In this communication state, a higher transmission level is necessary for transmission in order for the portable wireless terminal 1 to properly deliver the transmission signal Tx1 to the base station 2. Accordingly, the transmission level determination unit 12 determines the initial value of the transmission level of the transmission signal Tx1 to be a greater value as the reception level of the received signal Rx1 becomes lower.

Conversely, when the reception level of the received signal Rx1 is high, the transmission signal Tx1 can be properly delivered to the base station 2 at a low transmission level. Thus, the initial value of the transmission level is determined to be a smaller value as the reception level becomes higher. This avoids the use of an unnecessarily high transmission level for the transmission of the transmission signal Tx1, thus reducing the power consumption of the portable wireless terminal 1.

Table 1 shows an example of a correspondence relationship between the reception level of the received signal Rx and the initial value of the transmission level of the transmission signal Tx1. In Table 1, the initial value of the transmission level becomes smaller as the reception level becomes higher.

TABLE 1

| Reception Level [dBm] | Initial Value of Transmission Level [dBm] |
| --- | --- |
| −104 | 24 |
| −103 | 23 |
| −102 | 22 |
| −101 | 21 |
| −100 | 20 |
| −99 | 19 |
| −98 | 18 |
| −97 | 17 |
| −96 | 16 |
| −95 | 15 |
| −94 | 14 |
| −93 | 13 |
| −92 | 12 |
| −91 | 11 |
| −90 | 10 |
| −89 | 9 |
| −88 | 8 |
| −87 | 7 |
| −86 | 6 |

This table may be stored in advance in a storage (e.g., storage 103). The transmission level determination unit 12 determines the initial value of the transmission level on the basis of the table stored in the storage and the reception level measured by the reception level measuring unit 11. For a range of reception levels that are not included in this table, the initial value of the transmission level may be determined by appropriate interpolation.

Figure 8:
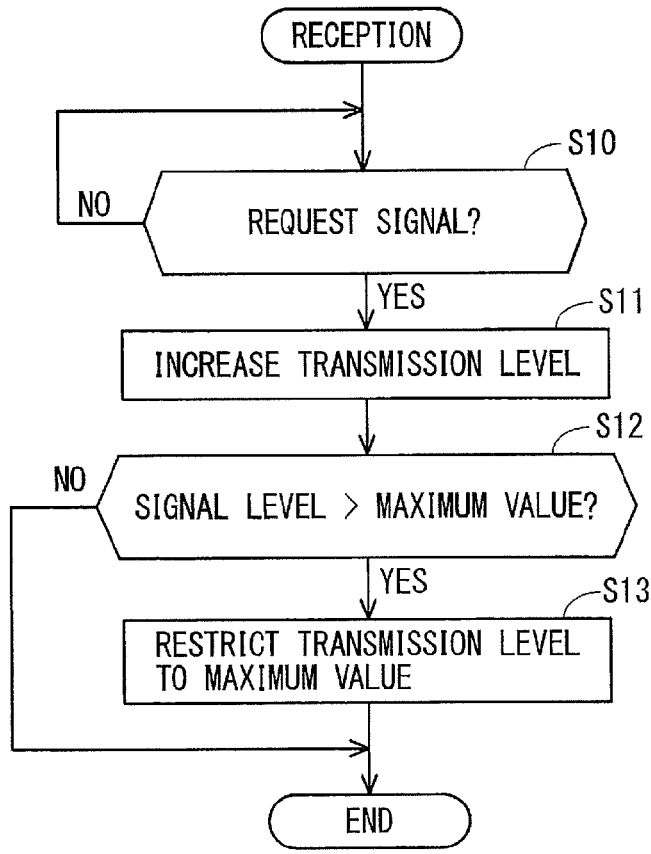
FIG. 8 illustrates a flowchart showing an example of operations of a transmission level determination unit.

On the other hand, a request signal (signal for requesting an increase in the transmission level) PR1 may be transmitted from the base station 2, as described above. The transmission level determination unit 12 can increase the transmission level in accordance with the request signal PR1. FIG. 8 illustrates a flowchart showing an example of the operation for determining the transmission level in accordance with the request signal PR1 from the base station 2.

As illustrated in FIG. 8, first in step S10, the controller 10 determines whether the request signal PR1 has been received. If it is determined that the request signal PR1 is not received, step S10 is executed again. If it is determined in step S10 that the request signal PR1 is received, the transmission level determination unit 12 increases the transmission level in accordance with this request signal PR1 in step S11. For example, Table 1 shows that when the reception level of the received signal Rx1 is −97 dBm, the transmission level of the transmission signal Tx1 is initially determined to be 17 dBm, but when the request signal PR1 is received, the transmission level is increased by, for example, 1 dBm in accordance with the request signal. When the request signal PR1 includes information regarding the amount of increase in the transmission level, the transmission level determination unit 12 increases the transmission level by that amount of increase.

Next, in step S12, the transmission level determination unit 12 determines whether the increased transmission level exceeds a maximum value. When the transmission level exceeds the maximum value, the transmission level determination unit 12 restricts the transmission level to this maximum value in step S13 and ends the processing. When the transmission level is lower than or equal to the maximum value in step S12, the processing directly ends.

That is, the transmission level determination unit 12 increases the transmission level in accordance with the request signal PR1 within a range in which the transmission level is at or below the maximum value.

The maximum value setting unit 13 can set the maximum value of the transmission level. More specifically, the maximum value of the transmission level can be set on the basis of whether the non-contact charging is being conducted. Whether the non-contact charging is being conducted is determined on the basis of the determination result obtained by the determination unit 14.

When the non-contact charging is not being conducted, the maximum value of the transmission level is set as follows. That is, Table 1 is referenced and the maximum value is set to a value that is greater than or equal to the initial value of the transmission level that corresponds to the minimum value of the reception level. In the illustration in Table 1, the minimum value of the reception level is set to −104 dBm, and the initial value of the corresponding transmission level is 24 dBm. Thus, when the non-contact charging is not being conducted, the maximum value is set to a value higher than or equal to 24 dBm.

Figure 9:
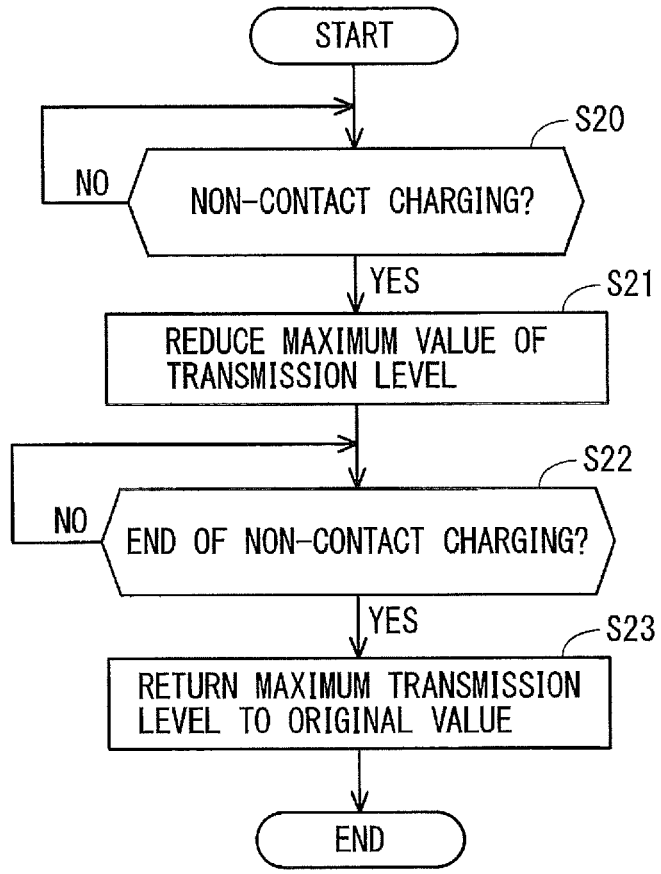
FIG. 9 illustrates a flowchart showing an example of operations of a maximum value setting unit.

FIG. 9 illustrates a flowchart showing an example of operations of the maximum value setting unit 1. In step S20, the maximum value setting unit 13 determines whether the non-contact charging is being conducted. When it is determined that the non-contact charging is not being conducted, step S20 is executed again. When it is determined in step S20 that the non-contact charging is being conducted, the maximum value setting unit 13 reduces and sets the maximum value of the transmission level in step S21. That is, a value smaller than the maximum value of the transmission level for when the non-contact charging is not being conducted is used as the maximum value of the transmission level during the non-contact charging. For example, the maximum value setting unit 13 sets the maximum value of the transmission level to 21 dBm.

Then, in step S22, the maximum value setting unit 13 determines whether the non-contact charging has ended. This determination can also be made on the basis of the determination result obtained by the determination unit 14. When it is determined that the non-contact charging has not ended, step S22 is executed again. When it is determined that the non-contact charging has ended, the maximum value setting unit 13 returns the maximum value of the transmission level to the original value (e.g., 24 dBm) in step S23.

As described above, the maximum value setting unit 13 sets the maximum value of the transmission level during the non-contact charging to a value smaller than the maximum value of the transmission level for when the non-contact charging is not being conducted. In describing the technical significance of this, an example of communication carried out during the non-contact charging will be described first.

Receipt Checking Operation During Non-Contact Charging

The controller 10 includes, for example, a receipt checking processor 17 (see FIG. 7). The receipt checking processor 17 can perform a receipt checking operation for checking the presence or absence of a communication from the base station 2 at a predetermined time interval (e.g., 5 seconds). That is, the receipt checking operation is intermittently repeated. The predetermined time interval can be timed using a timer circuit. This receipt checking operation is also performed during the charging of the battery 60. Thus, the receipt checking operation is also performed during the non-contact charging.

The receipt checking operation is performed in accordance with the rules between the portable wireless terminal 1 and the base station 2, and for example, may be performed as follows. That is, the receipt checking processor 17 transmits a check signal, and the base station 2 that has received this check signal checks the presence or absence of a signal that is to be transmitted to the portable wireless terminal 1 (e.g., an incoming call signal or e-mail from another portable wireless terminal 1) and transmits the check result. Upon receiving the check result, the receipt checking processor 17 gives notification indicating the check result to a functional unit that performs control in accordance with the check result. For example, when an incoming call signal is received from the portable wireless terminal 1 of a call partner, the receipt checking processor 17 gives notification indicating this result to a call processor, which will be described later. The call processor transmits notification indicating that the incoming call signal has been received to the base station 2, and also notifies the user of the presence of the incoming call. For example, a ring tone from the speaker 180 or the like is used to notify the user.

As described above, the portable wireless terminal 1 can communicate with the base station 2 even during the non-contact charging.

Receiving Sensitivity During Non-Contact Charging

During the non-contact charging, alternating current flows as a result of alternating voltage being applied to the battery charger coil 8a of the non-contact battery charger 8 as described above. Thus, the non-contact battery charger 8 generates a radio wave CW1. This radio wave CW1 is, for example, an electromagnetic wave having a fundamental component equal to the frequency of the alternating current flowing in the battery charger coil 8a, and includes higher-order frequency components.

When the radio wave CW1 includes a frequency component that substantially matches the difference between the frequency of the transmission signal Tx1 and the frequency of the received signal Rx1, intermodulation distortion of this frequency component and the transmission signal Tx1 produces a disturbance wave that disturbs the received signal Rx1.

For example, consider a case where the frequency bands of the transmission signal Tx1 and the received signal Rx1 are in the 1900 MHz band (the transmission band is in the range of 1851.25 to 1908.75 MHz and the reception band is in the range of 1931.25 to 1988.75 MHz), and the alternating voltage in the battery charger coil 8a has a frequency of, for example, 200 kHz. This frequency band is provided by, for example, code division multiple access (CDMA) 2000.

The non-contact battery charger 8 generates the radio wave CW1 that has a fundamental component of, for example, 200 kHz and a frequency component of 80 MHz as a higher-order frequency component. In the 1900 MHz band, the frequency difference between the transmission signal Tx1 and the received signal Rx1 is approximately 80 MHz, and at this time, a disturbance wave that disturbs the received signal Rx1 is generated. This degrades the receiving sensitivity of the portable wireless terminal 1.

The receiving sensitivity as used herein refers to a reception level necessary to properly analyze the received signal Rx1. For example, this is a reception level when the bit error rate of the received signal is equal to a reference value (e.g., 0.5%). As the reception level necessary to analyze the received signal Rx1 becomes lower, the received signal Rx1 is more readily received and at this time the receiving sensitivity is excellent.

Since the disturbance wave is also caused by the transmission signal Tx1 as described above, the disturbance wave becomes larger as the transmission level of the transmission signal Tx1 becomes higher. Accordingly, the receiving sensitivity to the received signal Rx1 degrades when the transmission level of the transmission signal Tx1 is increased during the non-contact charging.

Maximum Value of Transmission Level

When communication is carried out, the base station 2 may issue a request to increase the transmission level to the portable wireless terminal 1. This is as described previously, and even during the non-contact charging, such a request may be issued at the time of communication. Thus, there are cases where the transmission level determination unit 12 increases the transmission level in accordance with the request signal PR1 from the base station 2 during the non-contact charging. In this case, the receiving sensitivity of the portable wireless terminal 1 degrades with increasing transmission level. When the receiving sensitivity has degraded to some extent, the portable wireless terminal 1 may become incapable of properly receiving (analyzing) the received signal Rx1 from the base station 2.

Referring, for example, to Table 1, when the reception level of the received signal Rx1 is −99 dBm, the initial value of the transmission level of the transmission signal Tx1 is determined to be 19 dBm. Here, as one example, consider a case where the receiving sensitivity at this time is −101 dBm. In this situation, the reception level (−99 dBm) of the received signal Rx1 is higher than the receiving sensitivity (−101 dBm), and therefore the received signal Rx1 can be properly analyzed.

Then, when the base station 2 has transmitted the request signal PR1, the transmission level determination unit 12 determines the transmission level to be a value higher than 19 dBm. Accordingly, the receiving sensitivity degrades. If the receiving sensitivity exceeds −99 dBm as the transmission level increases, the received signal Rx1 will no longer be capable of being analyzed properly. That is, although a certain degree of degradation in the receiving sensitivity arising from an increase in the transmission level is acceptable, degradation that does not meet the required receiving sensitivity should be avoided.

In view of this, the maximum value of the transmission level during the non-contact charging is set to a value smaller than the maximum value of the transmission level for when the non-contact charging is not being conducted. It is thus possible to avoid a situation where the receiving sensitivity may degrade by more than a certain amount. This reduces the possibility of the receiving sensitivity exceeding the reception level, and accordingly contributes to appropriate receipt (analysis) of the received signal Rx1.

A more specific example will now be described below. The maximum value of the transmission level when the non-contact charging is not being conducted is, for example, greater than or equal to the transmission level (24 dBm) for when the reception level is the lowest, and here the maximum value is assumed to be 24 dBm (Table 1).

Referring, for example, to Table 1, when the reception level of the received signal Rx1 is −99 dBm, the initial value of the transmission level of the transmission signal Tx1 is determined to be 19 dBm. It is assumed that the receiving sensitivity at this time is −101 dBm. Since the reception level (−99 dBm) is higher than the receiving sensitivity (−101 dBm), the received signal Rx1 can be properly analyzed.

Then, when the base station 2 has transmitted the request signal PR1, the transmission level determination unit 12 determines the transmission level to be a value higher than 19 dBm. Accordingly, the receiving sensitivity degrades. If the receiving sensitivity exceeds −99 dBm, the received signal Rx1 cannot be analyzed properly.

In view of this, the maximum value of the transmission level during the non-contact charging is set to a value smaller than the maximum value of the transmission level for when non-contact charging is not being conducted. It is thus possible to avoid a situation where the receiving sensitivity may degrade by more than a certain amount. This reduces the possibility of the receiving sensitivity exceeding the reception level, and accordingly contributes to appropriate receipt (analysis) of the received signal Rx1.

A more specific example will now be described below. The maximum value of the transmission level for when the non-contact charging is not being conducted is, for example, greater than or equal to the transmission level (24 dBm) for when the reception level is the lowest, and here the maximum value is assumed to be 24 dBm (Table 1).

Figure 10:
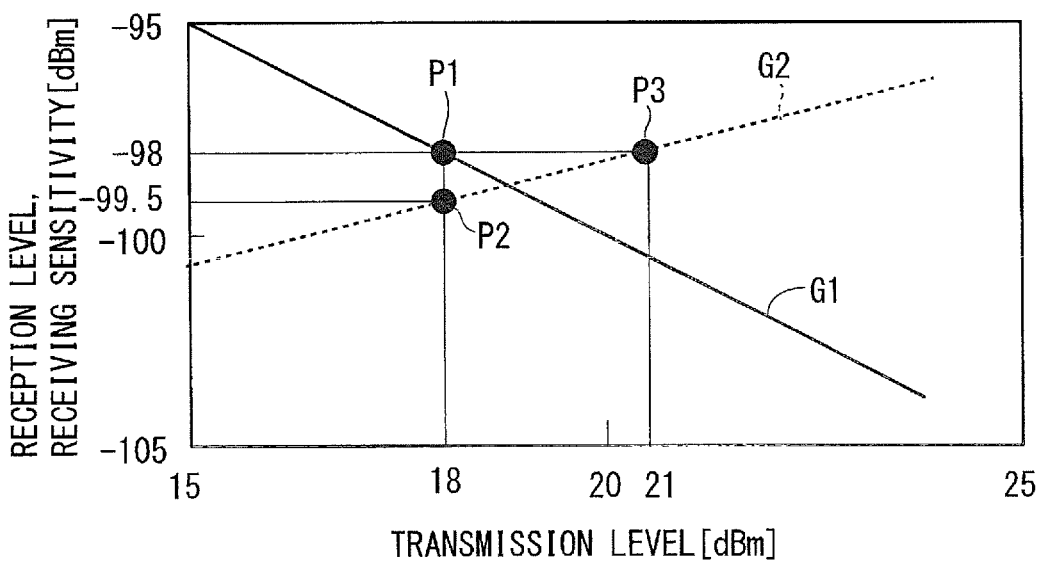
FIG. 10 schematically illustrates an example relationship between receiving sensitivity and transmission level and an example relationship between reception level and transmission level.

The receiving sensitivity degrades during the non-contact charging. Additionally, the receiving sensitivity degrades more as the transmission level becomes higher. FIG. 10 schematically illustrates the relationship in Table 1 (relationship between the reception level and the initial value of the transmission level) and an example relationship between the transmission level and the receiving sensitivity during the non-contact charging. Graph G1 indicates the former relationship, and Graph G2 indicates the latter relationship. In FIG. 10, the horizontal axis represents the transmission level, and the vertical axis represents the receiving sensitivity and the reception level.

During the non-contact charging in the illustration in FIG. 10, the receiving sensitivity is −98 dBm when the transmission level is 21 dBm (point P3). Although not illustrated in FIG. 10, the receiving sensitivity for when the transmission level is substantially zero (i.e., the minimum value of the receiving sensitivity) is greater than the minimum value (−104 dBm) of the reception level in Table 1 and is, for example, −102 dBm. The minimum value of the reception level in Table 1 is, for example, a minimum value that can be properly received by the portable wireless terminal 1 when the non-contact charging is not being conducted, and is determined depending on specifications.

Now, consider a case where the portable wireless terminal 1 has received the received signal Rx1 having a reception level of −98 dBm from the base station 2 during the non-contact charging. The reception level measuring unit 11 measures the reception level of this received signal. Then, the transmission level determination unit 12, based on Table 1, determines the initial value of the transmission level to be 18 dBm in accordance with the reception level (see point P1 in FIG. 10).

When the transmission level is 18 dBm, the receiving sensitivity is lower than −98 dBm and is, for example, −99.5 dBm (see point P2 in FIG. 10). That is, when the transmission level is 18 dBm, the reception level (−98 dBm) of the received signal Rx1 is higher than the receiving sensitivity (−99.5 dBm), and therefore the portable wireless terminal 1 can properly analyze the received signal Rx1.

If, in this state, the portable wireless terminal 1 receives the request signal PR1 from the base station 2, the transmission level determination unit 12 sets the transmission level to a value higher than 18 dBm. For example, when the transmission level is determined to be 21 dBm, the receiving sensitivity is −98 dBm (see point P3 in FIG. 10). Thus, when the transmission level is set to a value higher than 21 dBm, the receiving sensitivity becomes higher than the reception level (−98 dBm). At this time, it is difficult for the portable wireless terminal 1 to properly analyze the received signal Rx1.

In view of this, during the non-contact charging, the maximum value setting unit 13 sets the maximum value of the transmission level to a value (here, 21 dBm) smaller than the maximum value (24 dBm) for when the non-contact charging is not being performed. This avoids a situation where the receiving sensitivity may become higher than the reception level, thus allowing the received signal Rx1 to be properly received.

As described above, because the receiving sensitivity degrades when the transmission level determination unit 12 increases the transmission level in accordance with the request signal PR1 from the base station 2, a situation where the receiving sensitivity degrades by more than a certain amount can be avoided by the maximum value setting unit 13 setting the maximum value of the transmission level to a smaller value.

Note that the maximum value of the transmission level may be determined in advance or may be determined on the basis of the reception level measured by the reception level measuring unit 11. This is because, if the reception level is high, the received signal Rx1 can be properly received even with poor receiving sensitivity. That is, degradation in the receiving sensitivity due to an increase in the transmission level becomes more permissible as the reception level becomes higher. Accordingly, the maximum value of the transmission level may be set to a greater value as the reception level of the received signal Rx1 becomes higher. Conversely, the maximum value of the transmission level may be set to a smaller value as the reception level becomes lower.

The maximum value of the transmission level may be set to a transmission level that matches the measured reception level (e.g., −98 dBm), or may be a transmission level (e.g., 21 dBm) that provides lower receiving sensitivity than the above transmission level. In this case, the received signal Rx1 can be properly received.

Such a relationship between the reception level and the maximum value of the transmission level may be determined in advance and stored in a storage (e.g., storage 103).

Next, an example of operations of the controller 10 will be described with reference to the timing chart in FIG. 11. In the timing chart in FIG. 11, a call is made as will be described later in detail. Thus, an example of operations relating to a call will be briefly described first. As illustrated in FIG. 12, the controller 10 includes a call processor 18 and a display controller 19. The display controller 19 can control display on the display 20.

The call processor 18 can instruct the display controller 19 to display a call screen on the basis of, for example, an operation from a user. The display controller 19 can appropriately display a call screen on the display 20. This call screen includes appropriately arranged buttons including a selection button for selecting a call partner, an input button for inputting a telephone number, a call button for initiating a call to the portable wireless terminal 1 of the call partner, an answer button for answering an incoming call from a call partner, and a stop button for ending a call. Operations on these buttons are detected by the touch panel 30.

When the user has selected a call partner and operated the call button, the call processor 18 transmits a call signal to the portable wireless terminal 1 of the call partner via the base station 2. The portable wireless terminal 1 of the call partner receives this call signal as an incoming call signal. When the call partner has answered the call, the call processor 18 receives an answering signal from the portable wireless terminal 1 of the call partner via the base station 2 and establishes connection between the portable wireless terminal 1 of the user and the portable wireless terminal 1 of the call partner. Conversely, when a call signal from a call partner is received as an incoming call signal, the receipt checking processor 17 gives notification indicating this to the call processor 19. The call processor 18 notifies the user of the presence of the incoming call with a ring tone or the like. When the user has operated the answering button, notification indicating this is transmitted to the portable wireless terminal 1 of the call partner to establish connection.

The call processor 18 receives an audio signal from the portable wireless terminal 1 of the call partner and outputs this audio signal to the user via, for example, the piezoelectric vibrator 190, whereas the call processor 18 receives input of sound from the user via the microphone 150 and transmits this sound to the portable wireless terminal 1 of the call partner. When the user has operated the stop button, the call processor 18 transmits notification indicating this to the portable wireless terminal 1 of the call partner and terminates the connection to end the call. When a signal for ending the call is transmitted from the portable wireless terminal 1 of the call partner, the call processor 18 also terminates the connection to end the call.

The call processor 18 can also make a hands-free call. For example, the display controller 19 displays a button for allowing a user to input whether or not to make a hands-free call. When the user has operated this button, the call processor 18 outputs an audio signal received from the portable wireless terminal 1 of a call partner at a relatively high volume level from the speaker 180, and also increases the sensitivity of the microphone 150 to receive input of sound from a user who is relatively far away from the portable wireless terminal. This enables the user to make a call at a location away from the portable wireless terminal 1. Thus, the user can make a call, with the portable wireless terminal 1 remaining on the non-contact battery charger 8.

Alternatively, a hands-free call may be implemented using the head set 4, which is capable of near-field wireless communication. For example, the user configures settings regarding whether or not to make a call using the head set 4 on the portable wireless terminal 1. This head set 4 is worn by the user. When there is an incoming call from a call partner, the user operates a call answering button provided in the head set 4. In response to this, the head set 4 transmits an answering signal to the portable wireless terminal 1. Upon receiving this answering signal via the near-field wireless communication unit 90, the call processor 18 transmits an answering signal to the portable wireless terminal 1 of the call partner and starts a call. The call processor 18 receives an audio signal from the portable wireless terminal 1 of the call partner and transmits this audio signal to the head set 4. The call processor 18 also receives an audio signal from the user via the heat set 4 and transmits this audio signal to another portable wireless terminal 1. This enables the user to make a call. Since the user wears the head set 4 when making a call, the portable wireless terminal 1 can remain on the non-contact battery charger 8 during the call.

Figure 11:
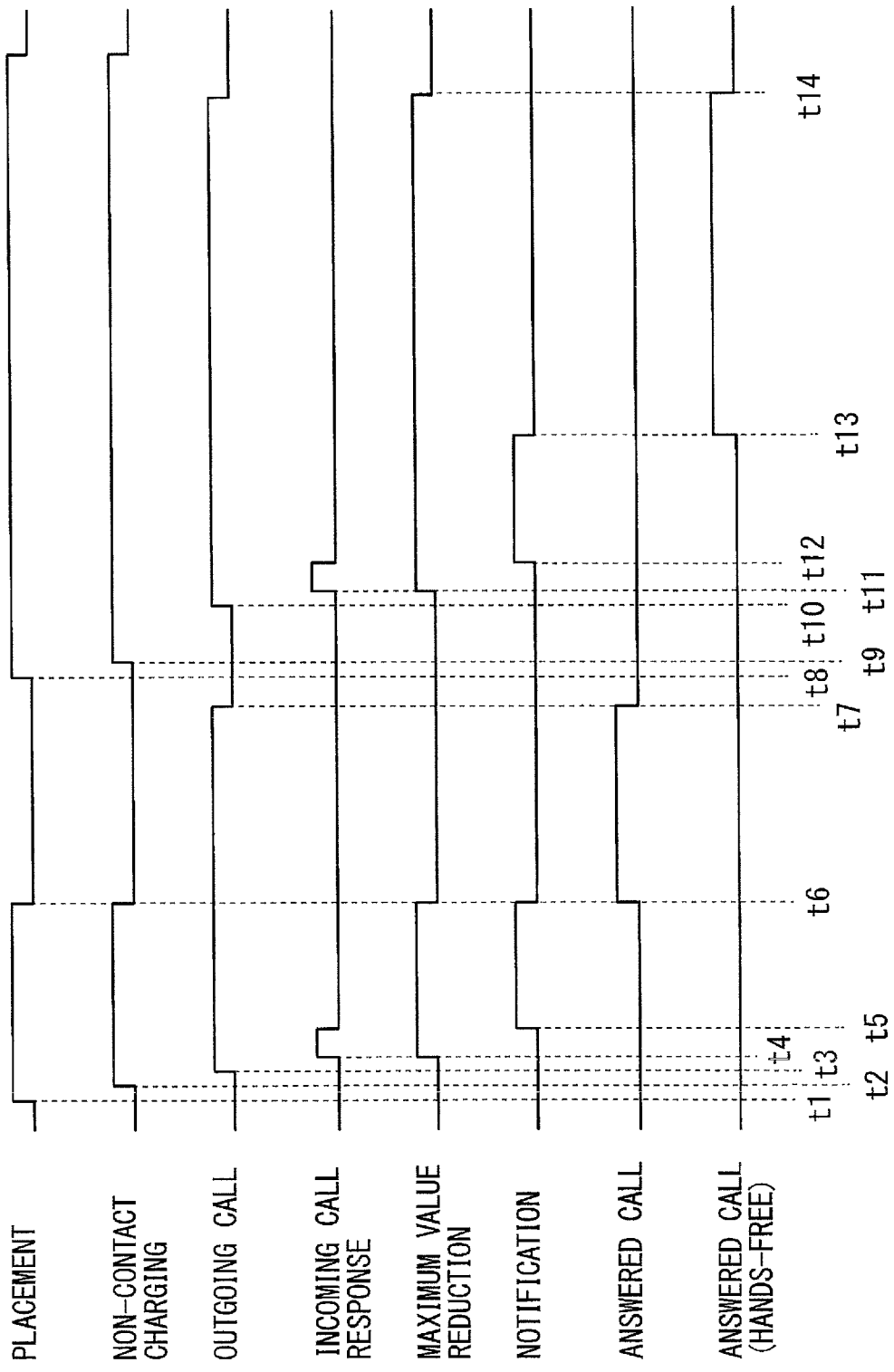
FIG. 11 illustrates an example timing chart.
Figure 12:
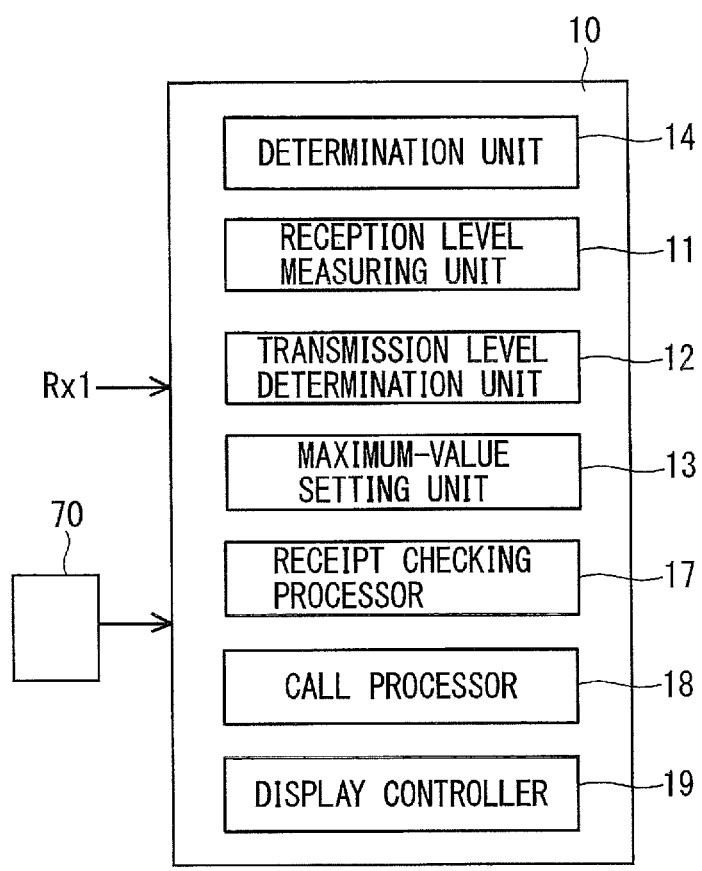
FIG. 12 illustrates a flowchart showing an example of operations of the controller.

In the timing chart in FIG. 11, a state in which each operation is performed is indicated by the active state of a signal, and a state in which the operation is not performed is indicated by the inactive state of the signal. For example, "Placement" refers to a state in which the portable wireless terminal 1 is placed on the non-contact battery charger 8, and an operation of the user placing the portable wireless terminal 1 on the non-contact battery charger 8 at time t1 is indicated by a signal transition from the inactive state to the active state at time t1.

Next, at time t2, the non-contact battery charger 8 starts applying alternating voltage to the battery charger coil 8a. A period of time between time t1 and time t2 is a period of time required for the non-contact battery charger 8 to recognize the placement of the portable wireless terminal 1. At time t2, the magnetic flux through the battery charger coil 8a links with the charging coil 82a, and the battery 60 is charged with the induced electromotive force in the charging coil 82a. That is, the non-contact charging is started.

Next, at time t3, the portable wireless terminal 1 of a call partner transmits a call signal for starting a call to the base station 2. In FIG. 11, "Outgoing Call" refers to a call by a caller and includes operations from the transmission of a call signal to the end of a call. The base station 2 receives a call signal and transmits the call signal as an incoming call signal to the portable wireless terminal 1.

At time t4, the call processor 18 receives the incoming call signal from the base station 2 and transmits a response indicating the receipt of the incoming call signal to the base station 2. At this time, the call processor 18 gives notification indicating the receipt of the incoming call signal to the transmission level determination unit 12. The transmission level determination unit 12 that has received this notification during the non-contact charging reduces the maximum value of the transmission level of the transmission signal Tx1. That is, in the illustration in FIG. 11, the maximum value of the transmission level is reduced when a call is started during the non-contact charging.

Unlike in the illustration in FIG. 11, the maximum value setting unit 13 may reduce the maximum value of the transmission level at the time of starting the non-contact charging (time t2).

Then, at time t5, the portable wireless terminal 1 notifies the user of the receipt of the incoming call. For example, the user is notified with a ring tone or the like. Then, at time t6, the user picks up the portable wireless terminal 1 from the non-contact battery charger 8 and operates the answering button. In FIG. 11, "Answered Call" includes operations from the operation of the answering button by the user to the end of the call.

In the illustration in FIG. 11, "Placement," "Non-Contact Charging," "Maximum Value Reduction," and "Notification" transition to inactive at time t6. That is, because the portable wireless terminal 1 is detached from the non-contact battery charger 8 and the non-contact charging ends, "Placement" and "Non-Contact Charging" transition to inactive, and because the maximum value of the transmission level is returned to the original value due to the end of non-contact charging, "Maximum Value Reduction" transitions to inactive. Also, the notification indicating an incoming call ends due to the user answering the call ("Notification" transitions to inactive).

At this time, the call is made without the non-contact charging. This allows appropriate communication (call) to be established without degradation in the receiving sensitivity due to the non-contact charging.

Next, the call ends at time t7, and the user again places the portable wireless terminal 1 on the non-contact battery charger 8 at time t8. The non-contact charging is started at time t9, and the portable wireless terminal 1 of a call partner transmits a call signal at time t10. Then, at time t11, the call processor 18 transmits an answering signal to the base station 2, and the maximum value setting unit 13 reduces the maximum value of the transmission level. At time t12, the user is notified of the incoming call. Note that, unlike in the illustration in FIG. 11, the maximum value setting unit 13 may reduce the maximum value of the transmission level at the time of starting the non-contact charging (time t9).

Then, at time t13, the user answers the call while the non-contact charging is being conducted. Such answering can be implemented by using, for example, a hands-free call (including a call using the head set 4).

The maximum value of the transmission level remains at the reduced value during a period of time (from time t13 to time t14) in which the call is being made while the non-contact charging is being conducted. Thus, the received signal Rx1 can be more properly received, and this contributes to a satisfactory call. Then, when the call has ended at time t14, the maximum value setting unit 13 returns the maximum value of the transmission level to the original value.

While, in the illustration in FIG. 11, the end of the call is used as a trigger to return the maximum value of the transmission level to the original value, the maximum value of the transmission level may remain at the reduced value if the non-contact charging continues even after the end of the call. Then, the end of the non-contact charging may be used as a trigger to return the maximum value of the transmission level to the original value. In this case, the received signal Rx1 can be received with more appropriate receiving sensitivity when the receipt checking operation is performed during the non-contact charging.

Second Embodiment

A second embodiment describes adjusting a charging current that flows to the battery 60 during the non-contact charging. In the illustration in FIG. 13, a current detector 76 is additionally located, as compared with the configuration illustrated in FIG. 6. The current detector 76 can detect a charging current during the non-contact charging. More specifically, the current detector 76 can detect a current that is output from, for example, the charging unit 80.

The controller 10 further includes a current controller 16. The current controller 16 can receive input of the current detected by the current detector 76 and output a control signal for controlling the current regulator 88 such that the current approaches a desired value.

Figure 14:
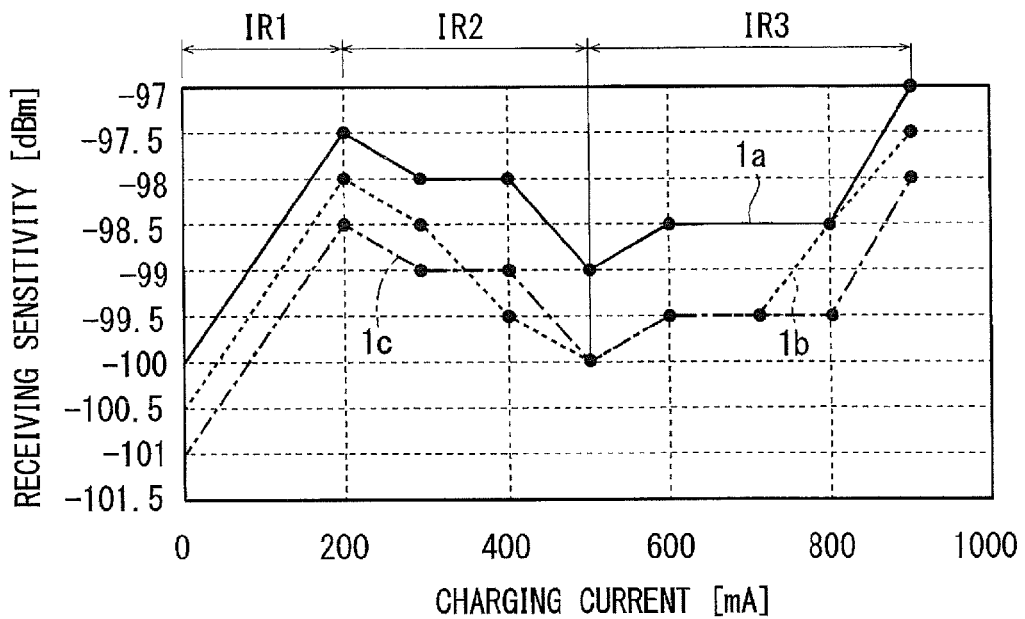
FIG. 14 schematically illustrates a relationship between charging current and receiving sensitivity.

FIG. 14 illustrates a graph schematically showing an example relationship between the charging current during the non-contact charging and the receiving sensitivity during the non-contact charging. Here, the transmission level is constant. The illustration in FIG. 14 shows three graphs for different frequency bands. Graphs 1a to 1c respectively indicate the relationships for low-, intermediate-, and high-frequency bands in the 1900 Hz band.

As can be understood from FIG. 14, in a small range IR1 where the charging current ranges from zero to 200 mA, the receiving sensitivity increases with increasing charging current. That is, the receiving sensitivity degrades. When the charging current further increases beyond this range IR1, the receiving sensitivity decreases (monotone non-increasing) with respect to the charging current (range IR2). When the charging current further increases, the receiving sensitivity increases (monotone non-decreasing) with respect to the charging current (range IR3).

In this way, the receiving sensitivity during the non-contact charging depends also on the charging current. The illustration in FIG. 14 shows a minimal value of the receiving sensitivity, i.e., an external value that provides excellent receiving sensitivity.

When the reception level of the received signal Rx1 is relatively high, the received signal Rx1 can be properly received even with poor receiving sensitivity. On the other hand, when the reception level of the received signal Rx1 is low, better receiving sensitivity is necessary.

Figure 15:
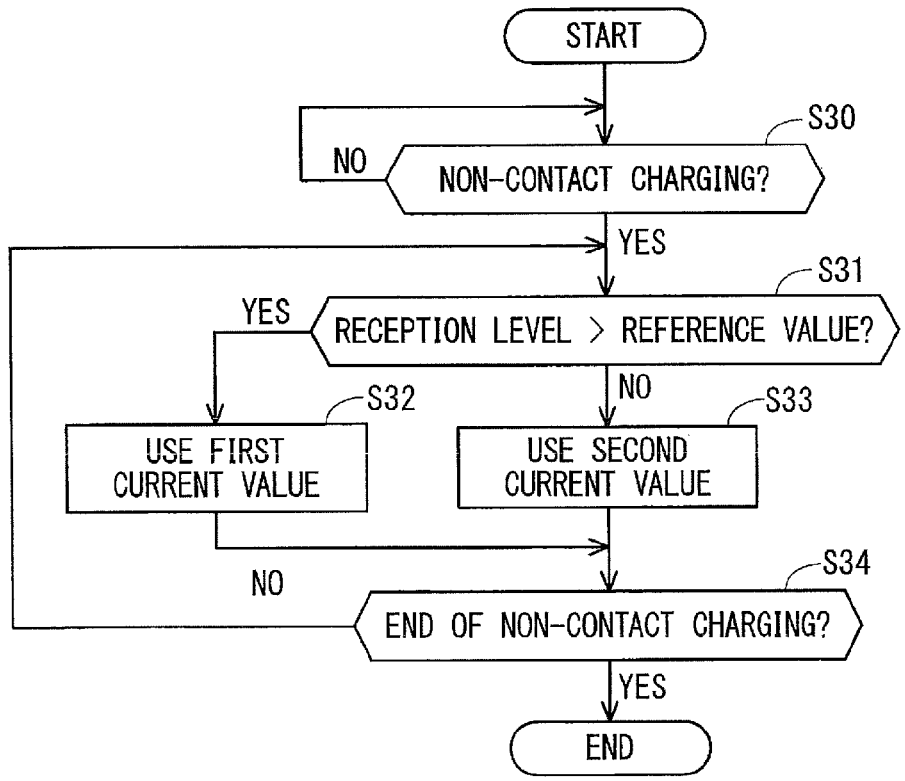
FIG. 15 illustrates a flowchart showing an example of operations of a current controller.

In view of this, the current controller 16 determines the charging current on the basis of the magnitude relation between the reception level measured by the reception level measuring unit 11 and a reference value. FIG. 15 illustrates a flowchart showing an example of operations of the controller 10. First, in step S30, the current controller 16 determines whether the non-contact charging is being conducted. This determination is made on the basis of the determination result obtained by the determination unit 14. When it is determined that the non-contact charging is not being conducted, step S30 is executed again. When it is determined that the non-contact charging is being conducted, the current controller 16 determines in step S31 whether the reception level measured by the reception level measuring unit 11 is higher than a reference value (e.g., −97 dBm).

When it is determined that the reception level is higher than the reference value, the charging current is controlled to be, for example, a relatively large first current value in step S32. That is, when the reception level is high, excellent receiving sensitivity is not required, and therefore the charging current is controlled to be the first current value without any consideration given to the receiving sensitivity. A specific value of the first current value is determined in consideration of, for example, charging time and a current allowable value for each unit. Here, as one example, the first current value is determined from the range IR3 where the receiving sensitivity is higher than the current value (e.g., 500 mA) that takes the external value and the receiving sensitivity degrades with increasing current. For example, a maximum value 900 mA in the range IR3 is used as the charging current. This first current value is, for example, determined in advance and stored in a storage (e.g., storage 103). The current controller 16 controls the current regulator 88 such that the current detected by the current detector 76 approaches the first current value (e.g., 900 mA).

On the other hand, when it is determined in step S31 that the measured reception level is lower than the reference value, in step S33, the current controller 16 controls the charging current to be a second current value such that the receiving sensitivity improves relative to the receiving sensitivity in step S32. Referring to FIG. 14, the second current value may be a current value (e.g., 500 mA) that provides the external value of the receiving sensitivity. In this case, the received signal Rx1 can be received with better receiving sensitivity than the receiving sensitivity in step S32. This second current value may also be determined in advance and stored in a storage (e.g., storage 103).

In step S34 next to step S32 or S33, the current controller 16 determines whether the non-contact charging has ended. When it is determined that the non-contact charging has not ended, step S31 is executed again. Executing steps S31 to S33 again in this way is processing that takes into consideration the fact that the reception level fluctuates depending on the communication state (so-called fading). That is, since the reception level may fluctuate during the non-contact charging, steps S31 to S33 are repeatedly executed to control the charging current in accordance with fluctuations in the reception level. On the other hand, when it is determined in step S34 that the non-contact charging has ended, the current controller 16 ends the operation of the current regulator 88.

As described above, in the second embodiment, when the reception level of the received signal Rx1 is high and does not require excellent receiving sensitivity, higher priority is given to the charging than the receiving sensitivity, and the charging current is determined to be the first current value. On the other hand, when the reception level of the received signal Rx1 is low and requires excellent receiving sensitivity, the charging current is adjusted (determined to be the second current value) to improve the receiving sensitivity relative to the receiving sensitivity for the first current value. That is, under the control of the current controller 16, the current regulator 88 adjusts the charging current flowing from the charging coil 82c to the battery 60 such that, when the reception level is lower than the reference value, the receiving sensitivity is improved relative to the receiving sensitivity for when the reception level is higher than the reference value. Accordingly, the received signal Rx1 can be readily received properly even if the reception level is low.

In the above-described example, the first current value for when the reception level is higher than the reference value is a value greater than the second current value for when the receiving sensitivity is lower than the reference value. Thus, the charging time can be shortened when the reception level is higher than the reference value.

In the above-described example, the charging current is not set to zero even when the reception level is lower than the reference value. It is thus possible to continue the non-contact charging even if the reception level is low.

However, unlike in the above-described example, the charging current may be set to zero when the reception level is lower than the reference value. That is, the non-contact charging may be interrupted when the reception level is low. This interruption may be implemented by, for example, stopping the operation of the current regulator 88, or the non-contact charging may be interrupted by transmitting a request to interrupt the operation to the non-contact battery charger 8 and stopping the operation of the non-contact battery charger 8. Since, in the illustration in FIG. 14, the receiving sensitivity for when the charging current is zero is lower than the external value of the receiving sensitivity, the received signal Rx1 can be received with better receiving sensitivity when the reception level is lower than the reference value. However, the charging is not conducted at this time. That is, the charging is sacrificed and appropriate receipt of the received signal Rx1 is given higher priority.

The reference value may be designed to have hysteresis because the reception level fluctuates depending on the communication state. That is, when the reception level is higher than the first reference value, the first current value (e.g., 900 mA) is used as the charging current, and when the reception level is lower than the second reference value (<first reference value), the second current value (e.g., 500 mA) is used to improve the receiving sensitivity. Thus, even if the reception level fluctuates in the range between the first reference value and the second reference value, switching of the charging current due to the fluctuations can be suppressed.

Alternatively, when the reception level is lower than the reference value, the current controller 16 may control the charging current in accordance with the reception level. More specifically, a current value providing receiving sensitivity that matches the reception level measured by the reception level measuring unit 11 or that is lower than this reception level is used as the second current value. Referring, for example, to Graph 1b, when the reception level is −98 dBm, the second current value is 800 mA (receiving sensitivity of −98.5 dBm), and when the reception level is −99 dBm, the second current value is 700 mA (receiving sensitivity of −99.5 dBm). The current value depending on the reception level is, for example, stored in advance in a storage (storage 103).

In this case as well, the received signal Rx1 can be properly received. Additionally, since the second current value is determined in accordance with the reception level, there is no need to use a small current value that provides a receiving sensitivity that is greater than necessary value. It is thus possible to improve selectivity of the second current value and to use a relatively large second current value in accordance with the reception level. This shortens the charging time.

Receipt Checking Operation

As described above, the receipt checking operation is also intermittently performed during the non-contact charging. The intermittent execution of the receipt checking operation results in the presence of periods of time during which communication is not carried out. Thus, (i) during the periods of time in which communication is not carried out, the current controller 16 may control the current regulator 88 such that a relatively large current value (e.g., the first current value of 900 mA) is used as the charging current. This is because degradation in the receiving sensitivity does not become a problem when communication is not carried out.

On the other hand, during the receipt checking operation performed while the non-contact charging is being conducted, the charging current may be determined in consideration of the reception level and the receiving sensitivity. However, a period of time that is spent on the receipt checking operation is short at around several tens of milliseconds, for example. Thus, it may sometimes be difficult during this period of time to determine the charging current in accordance with the magnitude relation between the reception level and the reference value. In this case, (ii) the second current value (e.g., 500 mA) may be used during the receipt checking operation, irrespective of whether the reception level is higher than the reference value.

More specifically, the operation of (ii) may be implemented as follows. The receipt checking processor 17 gives notification indicating the start of the receipt checking operation and the end of the receipt checking operation to the current controller 16. The receipt checking processor 17 also gives notification indicating the receipt of an incoming call signal to the current controller 16. The current controller 16 controls the charging current to be the second current value during a period of time from the start of the receipt checking operation to the end of the receipt checking operation (or the receipt of an incoming call signal). This allows the receipt checking operation to be performed with excellent receiving sensitivity even if the reception level of the received signal Rx1 is unknown during the receipt checking operation, and thereby allows the received signal Rx1 to be readily received properly.

On the other hand, when it is determined that the receipt checking processor 17 has received an incoming call signal during the receipt checking operation, the call processor 18 starts call processing. More specifically, the call processor 18 gives notification (notification with a ring tone or vibration) to the user, and starts a call when the user answers. Since the period of time for performing this call processing is longer than the period of time for performing the receipt checking operation, (iii) during this call period, the current controller 16 may determine the charging current in accordance with the magnitude relation between the reception level and the reference value. Note that when the call processing is started by the user selecting a call partner and operating the call button, the current controller 16 also determines the charging current in accordance with the magnitude relation between the reception level and the reference value during this call period.

Figure 16:
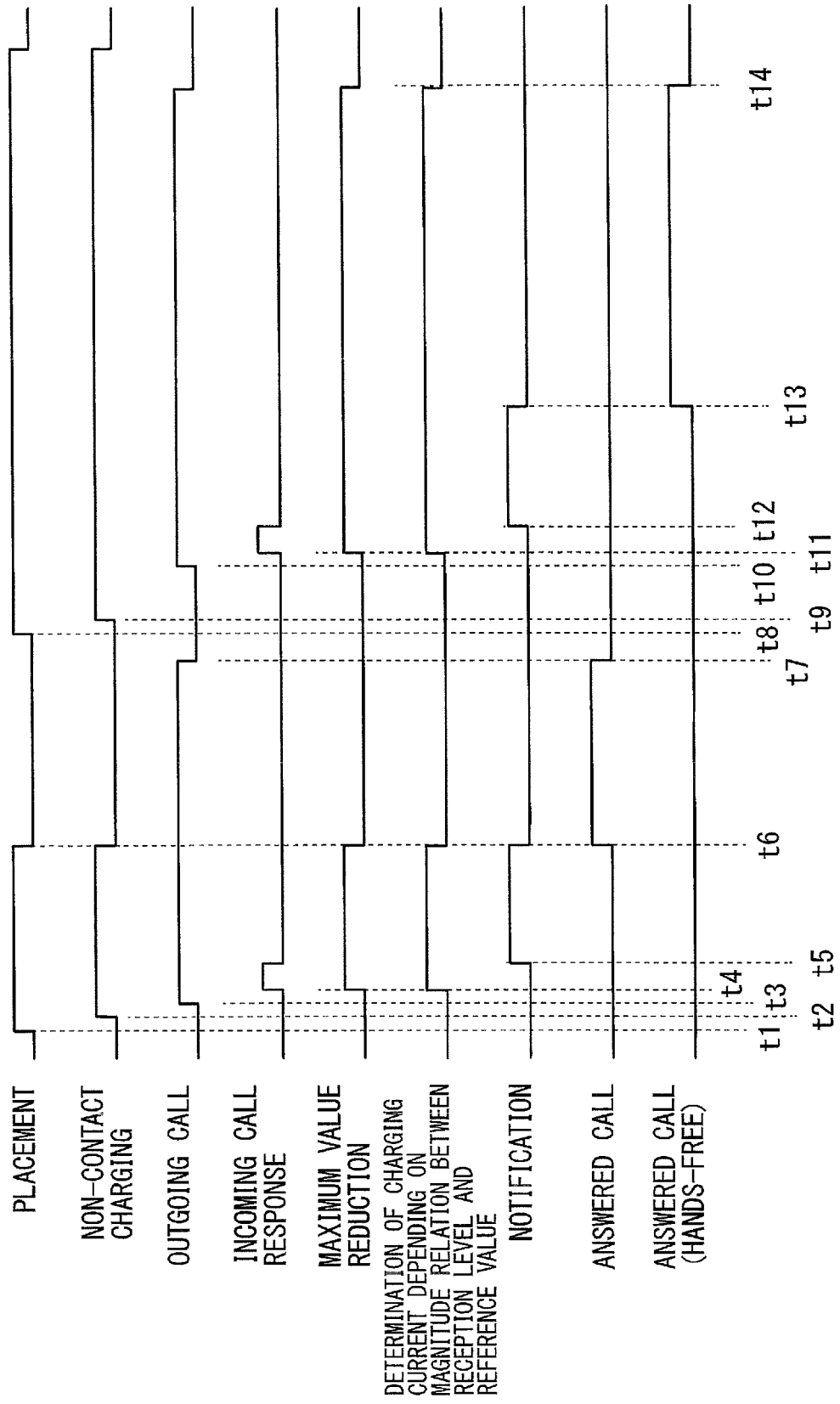
FIG. 16 illustrates an example timing chart.

FIG. 16 illustrates a timing chart showing an example of operations of the controller 10. FIG. 16 differs from FIG. 11 in that the presence or absence of "Determination of Charging Current Depending On Magnitude Relation Between Reception Level and Reference Value" is shown. In the illustration in FIG. 11, a case where the value of the charging current is determined in accordance with the magnitude relation between the reception level and the reference value is indicated by the active state of a signal, and a case where a predetermined value is used as the value of the charging current is indicated by the inactive state of the signal.

In the illustration in FIG. 16, the value of the charging current is determined in accordance with the magnitude relation between the reception level and the reference value during call periods (a period from time t4 to time t6 and a period from time t11 to time t14) while the non-contact charging is being conducted. On the other hand, a predetermined value is used as the charging current during the other periods. More specifically, (i) the first current value is used when communication is not carried out and (ii) the second current value is used during the receipt checking operation, as described above.

In summary, the charging current during the non-contact charging may be controlled as follows: (i) the first current value is used during periods when communication is not carried out; (ii) the second current value is used during periods when the receipt checking operation is being performed (there is no incoming call signal); and (iii) the current value of the charging current is determined in accordance with the magnitude relation between the reception level and the reference value during call periods.

Figure 13:
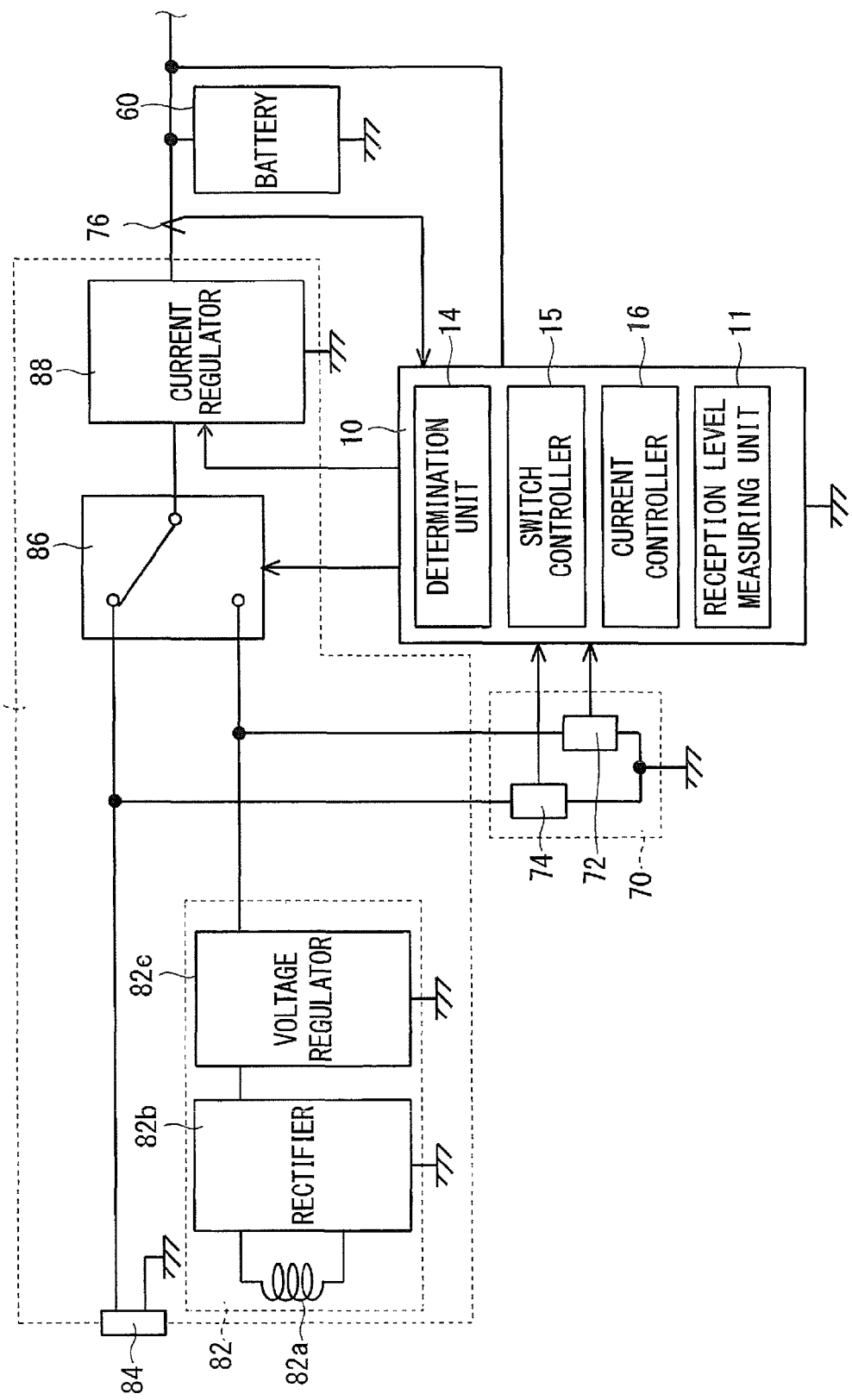
FIG. 13 illustrates a block diagram schematically showing example internal configurations of the charger and the charging detector.

In the illustration in FIG. 13, the current controller 16 receives input of the current detected by the current detector 76 and controls the current regulator 88 such that the detected current approaches a desired value. That is, control is performed by feeding back the current. However, feedback control is not an absolute necessity, and feedforward control may be performed instead. In this case, the current detector 76 is unnecessary.

Example of Combining First and Second Embodiments

FIG. 23 illustrates an example of control of the maximum value of the transmission level, control of the charging current, and conditions for the control. In the illustration in FIG. 23, control for reducing the maximum value of the transmission level is not performed when the frequency band is 800 MHz band. That is, it is assumed here that in the 800 MHz band, there is a low correlation between the receiving sensitivity and the transmission level.

When the frequency band is 800 MHz band, the non-contact charging is stopped during the receipt checking operation, irrespective of the magnitude of the reception level of the received signal Rx1. That is, the charging current is set to zero. This allows the receipt checking operation to be performed with better receiving sensitivity.

On the other hand, the magnitude of the charging current during communication is changed depending on whether the reception level is higher than the reference value or lower than the reference value. More specifically, when the reception level is higher than the reference value, the non-contact charging is conducted using the charging current (e.g., 900 mA) that is determined irrespective of the receiving sensitivity. On the other hand, when the reception level is lower than the reference value, the non-contact charging is stopped.

In this way, when the reception level is sufficiently high during communication, the non-contact charging is conducted using a normal current value because the receiving sensitivity is not required, and when the reception level is low, the receiving sensitivity is given priority and the non-contact charging is stopped.

Figure 18:
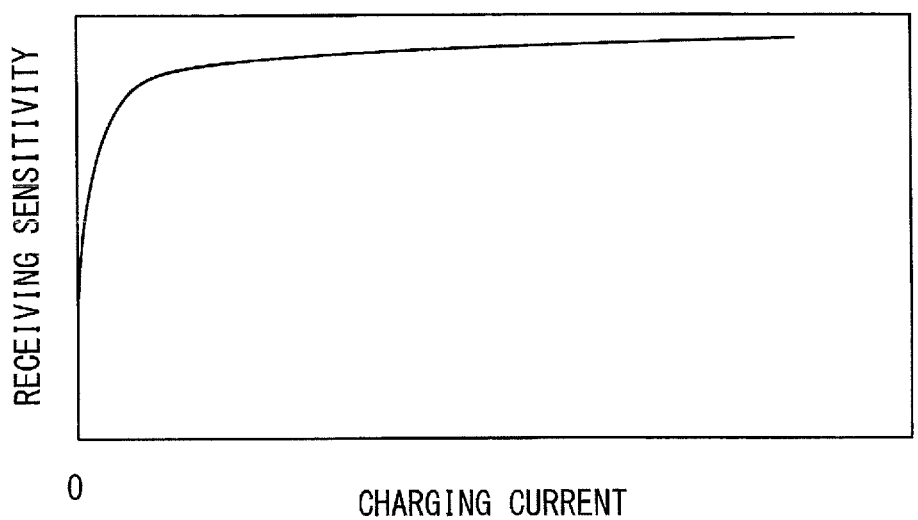
FIG. 18 schematically illustrates a relationship between charging current and receiving sensitivity.

It is assumed here that in the 800 MHz band, the receiving sensitivity degrades stepwise with respect to the charging current as illustrated in FIG. 18. Thus, in one example, the charging current is set to zero when the reception level is low.

As described above, the charging is stopped during the receipt checking operation, irrespective of the magnitude of the reception level, and the charging current is changed depending on the magnitude of the reception level during communication. This is because the period of time required for the receipt checking operation is short. That is, there is not enough time during the receipt checking operation to determine the magnitude of the reception level, and therefore the charging current is set to zero, irrespective of the magnitude of the reception level.

Next is a description of a case where the frequency band is 1900 MHz. In the illustration in FIG. 23, when the transmission signal Rx1 is transmitted during the non-contact charging, the maximum value of the transmission level is reduced, irrespective of whether it is during the receipt checking operation or during communication and whether the reception level is higher than the reference value. That is, it is assumed here that the receiving sensitivity degrades with increasing transmission level in the 1900 MHz band. By reducing the maximum value of the transmission level in this way, it is possible to receive the received signal Rx1 with better receiving sensitivity during the non-contact charging.

Also, when the frequency band is 1900 MHz, the non-contact charging is conducted using a current value (e.g., 500 mA) that can improve the receiving sensitivity during the receipt checking operation, irrespective of the magnitude of the reception level of the received signal Rx1. This allows the receipt checking operation to be performed with better receiving sensitivity.

On the other hand, during communication, the magnitude of the charging current is changed depending on whether the reception level is higher than the reference value or lower than the reference value. More specifically, when the reception level is higher than the reference value, the non-contact charging is conducted using the first current value (e.g., 900 mA) that is determined irrespective of the receiving sensitivity. On the other hand, when the reception level is lower than the reference value, the non-contact charging is conducted using the second current value (e.g., 500 mA) that can improve the receiving sensitivity. Note that the "second current value that can improve the receiving sensitivity" as used herein refers to a current value that provides higher receiving sensitivity than the receiving sensitivity for the case of using the first current value.

As described above, when the reception level during communication is sufficiently high, the non-contact charging is conducted using the normal first current value because the receiving sensitivity is not required, and when the reception level is low, the non-contact charging is conducted using the second current value that gives priority to the receiving sensitivity.

Third Embodiment

The first embodiment describes that the transmission signal Tx1 and a higher-order frequency component of the radio wave CW1 from the non-contact battery charger 8 generate the disturbance wave disturbing the received signal Rx1. Here, consider a frequency band that hardly generates such disturbance waves. As one example of such a frequency band, a frequency band is conceivable in which, for example, a sum of the frequency of the transmission signal and one of the higher-order frequencies of the electromagnetic wave generated from the battery charger coil 8a does not match that of the received signal. Here, "does not match" means, for example, that the difference between the above sum and the frequency of the received signal is greater than the signal width (frequency width) of the received signal.

Here, the 800 MHz band (the transmission band of 824.7 to 848.31 MHz and the reception band of 869.7 to 893.31 MHz or the transmission band of 817.9 to 823.1 MHz and the reception band of 862.9 to 868.1 MHz) is illustrated as an example of the frequency band that hardly generates disturbance waves.

At this time, there is a lower correlation between an increase in transmission level and degradation in receiving sensitivity during the non-contact charging than in the frequency band described in the first embodiment. That is, the receiving sensitivity hardly degrades in this frequency band even if the transmission level is increased. Thus, in this frequency band, the maximum value setting unit 13 does not change the maximum value of the transmission level depending on whether the non-contact charging is being conducted.

Figure 17:
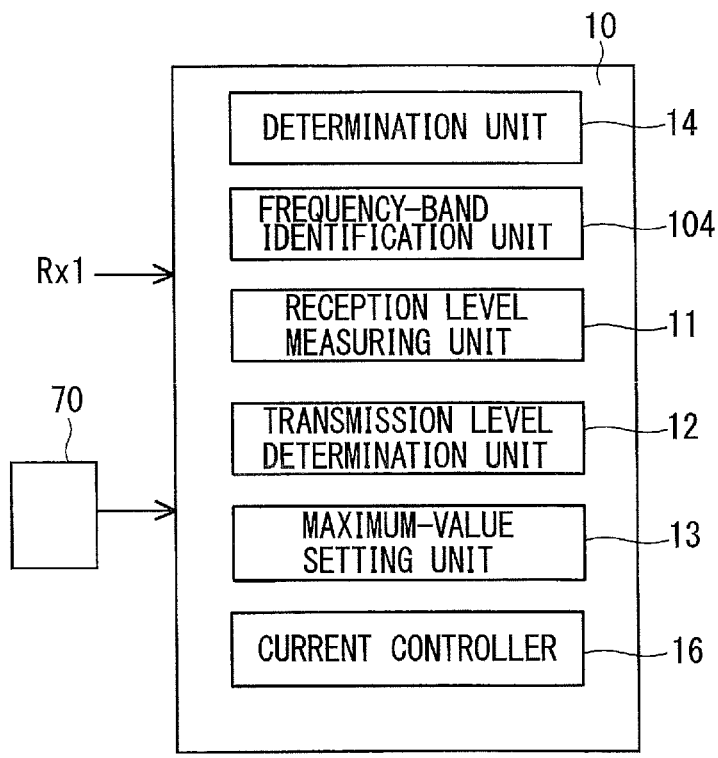
FIG. 17 illustrates a flowchart showing an example of operations of the controller.

The controller 10 in FIG. 17 further includes a frequency-band identification unit 104, as compared with FIG. 7. The frequency-band identification unit 104 can identify the frequency band of the transmission signal Tx1 and the received signal Rx1. For example, when the frequency band to be used is determined in advance, information regarding this frequency band may be stored in a storage (e.g., storage 103), and the frequency-band identification unit 104 may read this information in the storage and identify the frequency band. In this case, the wireless communication unit 110 carries out communication in only that frequency band.

Alternatively, the wireless communication unit 110 may support a plurality of frequency bands. That is, the wireless communication unit 110 can carry out communication in a plurality of frequency bands. In this case, the controller 10 changes the frequency band in succession via the wireless communication unit 110 and carries out communication. To describe, for example, the receipt checking operation, the receipt checking operation is first performed in, for example, a first frequency band (e.g., 1900 MHz band) that generates disturbance waves. Then, when there is a signal (e.g., an incoming call) to be transmitted to the portable wireless terminal 1, operations corresponding to the signal are performed, and when there is no such a signal, operations in the first frequency band ends. Then, the receipt checking operation is performed in a second frequency band (e.g., 800 MHz band) that hardly generates disturbance waves. When there is a signal to be transmitted to the portable wireless terminal 1, operations corresponding to the signal are performed, and when there is no such a signal, operations in the second frequency band ends. The frequency-band identification unit 104 identifies the frequency band that carries out communication.

When communication is carried out in the first frequency band, the maximum value setting unit 13 determines the maximum value of the transmission level during the non-contact charging to be smaller than the maximum value of the transmission level for when the non-contact charging is not being conducted, as described in the first embodiment.

On the other hand, when communication is carried out in the second frequency band, the maximum value setting unit 13 does not change the maximum value of the transmission level, irrespective of whether the non-contact charging is being conducted. This reduces the number of processes and simplifies the processing.

Charging Current

Next is a description of the charging current during the non-contact charging. There are cases in the second frequency band in which the relationship between the charging current and the receiving sensitivity changes generally stepwise during the non-contact charging. FIG. 18 schematically illustrates an example of the relationship between the charging current and the receiving sensitivity. When the charging current increases from zero, the receiving sensitivity sharply degrades with increasing charging current, and when the receiving sensitivity reaches a certain fixed level, the receiving sensitivity little changes with increasing charging current. That is, the receiving sensitivity sharply increases when the charging current is small and gradually approaches or converges to a certain fixed level. As illustrated in FIG. 18, the range (range of the charging current) in which the receiving sensitivity increases is narrow.

In this second frequency band, the current controller 16 uses zero as the second current value for when the reception level is lower than the reference value. That is, when the reception level is lower than the reference value, the receiving sensitivity is given priority and the non-contact charging is interrupted. To describe this with reference to FIG. 15, the current controller 16 sets the charging current to zero in the second frequency band in step S33.

In the second embodiment, when the time that is spent on the receipt checking operation is too short to determine the current value in accordance with the magnitude relation between the reception level and the reference value, (ii) the charging current is controlled to be the second current value during the receipt checking operation. In the second frequency band, the second current value is also set to zero during the receipt checking operation. That is, the non-contact charging is interrupted during the receipt checking operation. This allows the receipt checking operation to be performed with better receiving sensitivity even if the reception level is unknown.

The above example is described using the 1900 MHz band and the 800 MHz band. However, depending on the specifications of the portable wireless terminal 1 and the non-contact battery charger 8, it is also conceivable that the strength of the correlation between the transmission level and the receiving sensitivity is reversed between the 1900 MHz band and the 800 MHz band. In this case, the operations of the maximum value setting unit 13 are also reversed. In summary, the maximum value setting unit 13 reduces the maximum value of the transmission level during the non-contact charging in the first frequency band in which there is a strong correlation between an increase in transmission level and degradation in receiving sensitivity, and does not change the maximum value of the transmission level in accordance with whether the non-contact charging is being conducted, in the second frequency band in which the correlation is weaker than that in the first frequency band.

Similarly, depending on the specifications of the portable wireless terminal 1 and the non-contact battery charger 8, it is also conceivable that the correlation between the charging current and the receiving sensitivity is reversed from the above description between the 1900 MHz band and the 800 MHz band. In this case, the operations of the current controller 16 are also reversed. In summary, the current controller 16 sets the charging current to zero when the reception level is lower than the reference value or during the receipt checking operation, in the frequency band in which the receiving sensitivity does not relatively change with changing charging current in the range (e.g., 100 mA or higher) used for charging.

Fourth Embodiment

A fourth embodiment describes a display screen that is displayed when there is an incoming call during the non-contact charging. It is assumed here that, as described in the second and third embodiments, the current controller 16 adjusts the charging current in accordance with the magnitude relation between the reception level and the reference value during periods when a call is made (including the receipt of an incoming call signal and the transmission of a call signal) while the non-contact charging is being conducted. That is, it is assumed that the charging current is reduced when the reception level is lower than the reference value.

When a call is made during the non-contact charging, the display controller 19 displays charging information regarding a reduction in the charging current, in the display area 2*a*. This charging information indicates the possibility of the non-contact charging being suppressed during the call (i.e., possibility that the charging current will be reduced).

Figure 19:
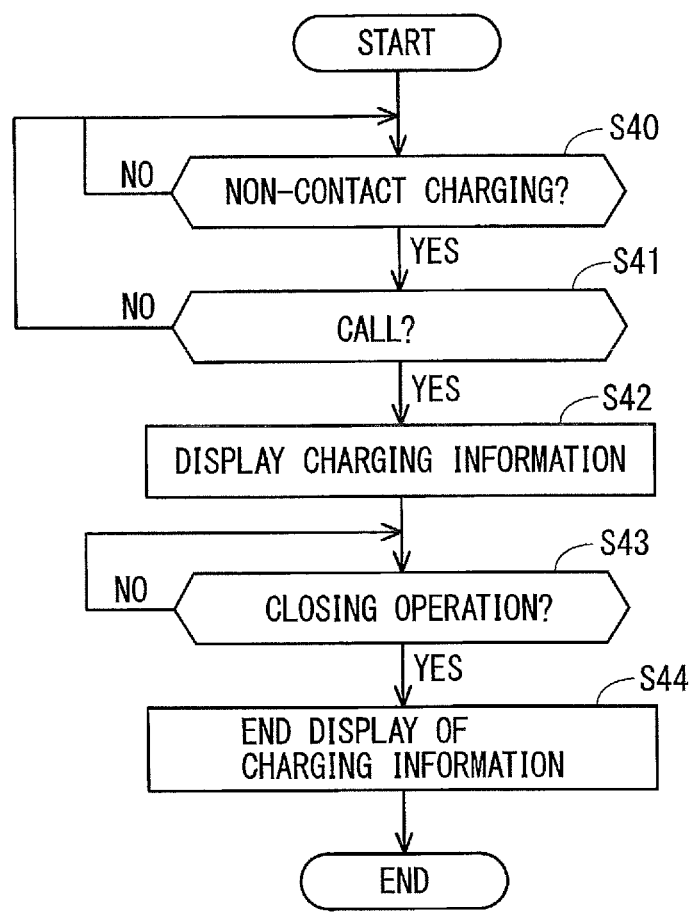
FIG. 19 illustrates a flowchart showing an example of operations of a display controller.

FIG. 19 illustrates a flowchart showing an example of operations of the display controller 19. In step S40, the display controller 19 determines whether the non-contact charging is being conducted. This determination is made on the basis of the determination result obtained by the determination unit 14. When it is determined that the non-contact charging is not being conducted, step S40 is executed again.

When it is determined that the non-contact charging is being conducted, the display controller 19 determines whether a call is in progress in step S41. This is implemented by the call processor 18 notifying the display controller 19 of information indicating whether a call is in progress. When it is determined that a call is not in progress, step S40 is executed again.

Figure 20:
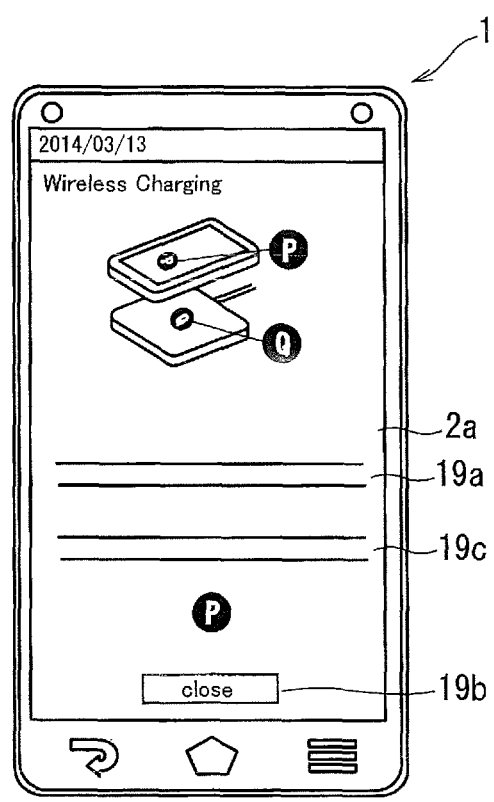
FIG. 20 schematically illustrates an example of a charging notification screen.

When it is determined that a call is in progress, i.e., when a call is in progress during the non-contact charging, the display controller 19 displays the charging information on the display 20 in step S42. FIG. 20 illustrates an example of the display screen (hereinafter, referred to as "charging notification screen") displayed on the display area 2*a*. The display area 2*a* displays charging information 19*a* that is schematically indicated by lines in the illustration in FIG. 20. This charging information 19*a* may be a sentence such as "Please be aware that the non-contact charging may be suppressed during a voice call." When the reception level is lower than the reference value and the charging current is set to zero, the charging information 19*a* provides information regarding the possibility of the charging being interrupted, and may be a sentence such as "Please be aware that the non-contact charging may be interrupted during a voice call."

In the next step S43, the display controller 19 determines whether a closing operation for closing the display of the charging information 19*a*, i.e., the display of the charging notification screen, has been performed. In the illustration in FIG. 20, the charging notification screen displays a close button 19*b*. One example of the closing operation is an operation made on this close button 19*b*. When the close button 19*b* is not operated, step S43 is executed. When the close button 19*b* is operated, the display controller 19 closes the display of the charging information 19*a*, i.e., the display of the charging notification screen, in step S44. Then, the display controller 19 displays a call screen for ending the call.

This enables the user to recognize the possibility of the charging being suppressed or interrupted during a voice call. Thus, the user is able to take appropriate measures when the remaining capacity of the battery 60 is small and more efficient charging is required. More specifically, the user may connect a direct-contact battery charger to the charging connector 84 to charge the battery 60 with the voltage of the charging connector 84. Or, the user may recognize the charging information 19*a* and avoid a call.

In step S42, the display controller 19 may display not only the charging information 19*a* but also charge switching information 19*c* that prompts the user to charge the battery with the voltage of the charging connector 84. In the illustration in FIG. 20, the charge switching information 19*c* is schematically indicated by underlines. The charge switching information 19*c* may be a sentence such as "Use of a direct-contact battery charger for charging is recommended." This enables the user to more directly recognize the necessity of charging the battery with the voltage of the charging connector 84.

While in the example described above, the display of the charging notification screen is closed by the closing operation in step S43, the display may be closed when the call has ended or when the non-contact charging has ended.

Here, another charging notification screen different from the notification screen is displayed. Thus, the charging notification screen may be displayed at the following timing. For example, when an incoming call signal is received from the portable wireless terminal 1 of a call partner, the charging notification screen is not displayed at this timing because the display controller 19 displays the call screen for accepting input of whether or not to answer the call. Then, the display controller 19 displays the charging notification screen when the user has performed an operation for answering the incoming call.

When the user has performed an operation for selecting a call partner and transmitting a call signal, the display controller 19 displays a call screen indicating that the call partner is being called. Thus, the charging notification screen is not displayed at this timing. When an answering signal is received from the portable wireless terminal 1 of the call partner, the display controller 19 displays the charging notification screen.

This allows the charging notification screen to be displayed without inhibiting the call operation.

While in the above example, the information 19a and 19c is displayed on the charging notification screen different from the call screen, the information 19a and 19c may be displayed on the call screen.

In the examples described in the second and third embodiments, when the reception level is higher than the reference value during the non-contact charging, the relatively large first current value is used as the charging current, and when the reception level is lower than the reference value, the second current value (including zero) smaller than the first current value is used. That is, the charging current decreases when the reception level is lower than the reference value. Thus, the display controller 19 may display the information 19a (and also the information 19c) on the display area 2a when the reception level is lower than the reference value. That is, the information 19a (and also the information 19c) is displayed when the charging current has actually decreased.

Figure 21:
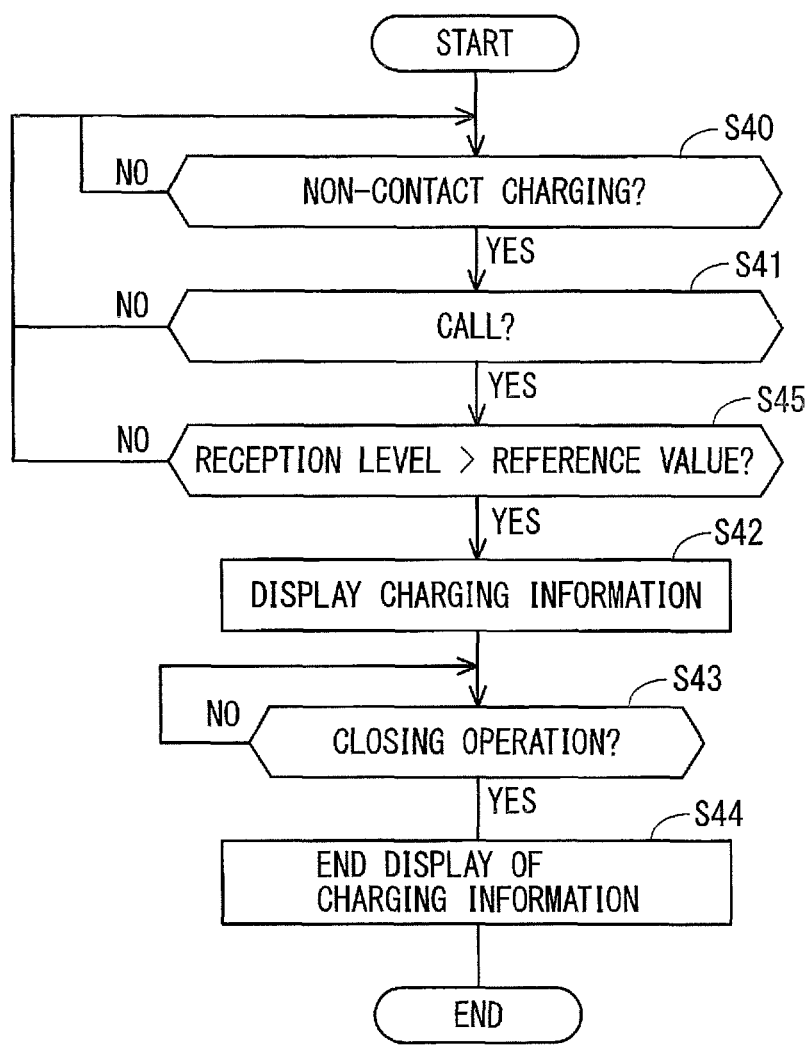
FIG. 21 illustrates a flowchart showing an example of operations of the display controller.

FIG. 21 illustrates a flowchart showing an example of operations of the display controller 19. As compared with FIG. 19, step S45 is further executed. For example, step S45 is executed when the determination result in step S41 is in the affirmative. On the other hand, an affirmative determination result in step S41 is not sufficient to execute step S42. In step S45, the display controller 19 determines whether the reception level measured by the reception level measuring unit 11 is higher than the reference value. When the reception level is higher than the reference value, step S40 is executed. When the reception level is lower than the reference value, step S42 is executed.

In this case, the information 19a (and also the information 19c) is displayed when the charging current has actually decreased. This enables the user to recognize that the charging current has actually decreased. The information 19a at this time may be information indicating that the charging current has actually decreased. For example, when the second current value is a value other than zero, the information 19a may be a sentence such as "Charging has been suppressed," and when the second current value is zero, the information 19a may be a sentence such as "Charging has been interrupted."

When the charging is interrupted, i.e., when the second current value is zero, the amount of charge in the battery 60 is reduced due to the call. Thus, in this case, a reduction in the amount of charge may be used as a trigger to display the information 19a (and also the information 19c).

Figure 22:
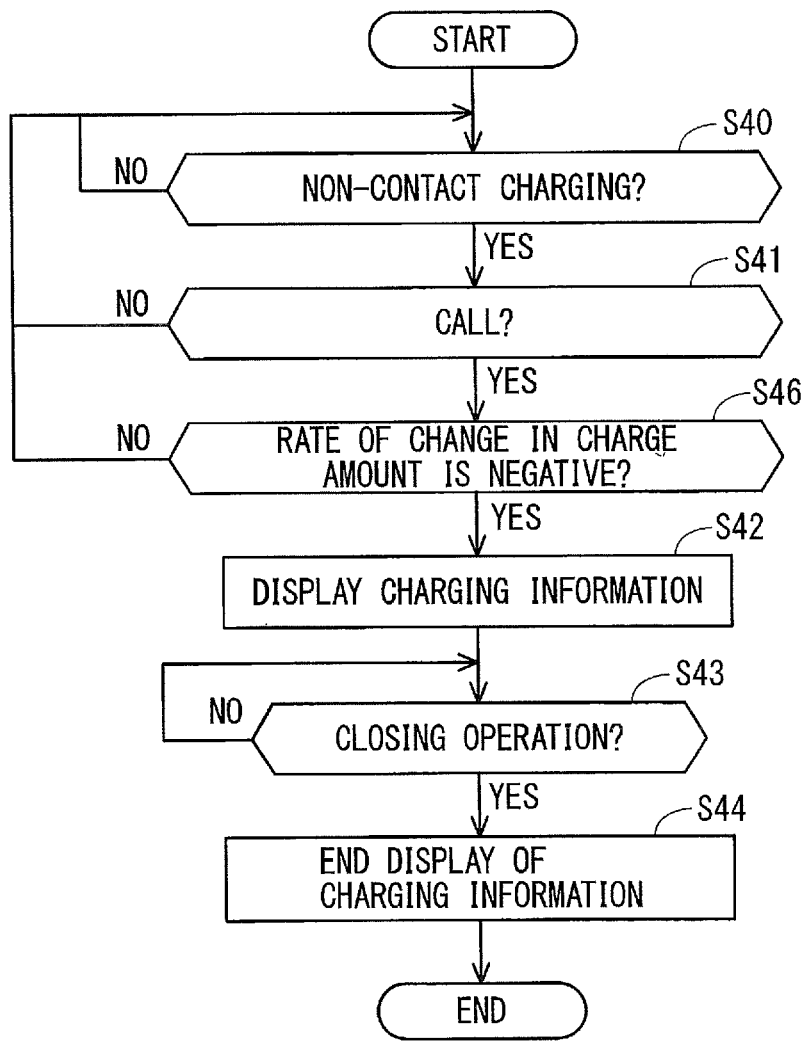
FIG. 22 illustrates a flowchart showing an example of operations of the display controller.

FIG. 22 illustrates a flowchart showing an example of operations of the display controller 19. As compared with FIG. 19, step S46 is further executed. For example, step S46 is executed when the determination result in step S41 is in the affirmative. On the other hand, an affirmative determination result in step S41 is not sufficient to execute step S42. In step S46, the display controller 19 determines whether the rate of change in the amount of charge in the battery 60, detected by the charge-amount detector 78, with respect to time is negative. When it is determined that the rate of change is positive, it can be considered that the charging is being conducted, and therefore step S40 is executed again. When it is determined that the rate of change is negative, step S42 is executed.

In this case, the information 19a (and also the information 19c) is displayed when the charging has actually been interrupted. This enables the user to recognize that the charging has been interrupted. The information 19a may be information indicating that the charging current has actually been interrupted (is currently in an interrupted state), and may be a sentence such as "Charging has been interrupted."

In the example described above, when the charging is maintained even if the reception level is lower than the reference value, i.e., when the second current value is a value other than zero, the display controller 19 also displays the information 19a indicating that the charging has been suppressed. However, in this case, the information 19a and 19c does not necessarily have to be displayed. This is because the fact that the charging has been suppressed is considered to not always be important information to the user, and therefore the display of the information may be omitted. This simplifies the processing.

For example, it is assumed that when the reception level in the 1900 MHz band is lower than the reference value, the charging current is controlled to be, for example, 500 mA, and when the reception level in the 800 MHz band is lower than the reference value, the charging current is controlled to be zero. In this case, when a call is made using the 1900 MHz band during the non-contact charging, the display controller 19 does not display the information 19a and 19c, and when a call is made using the 800 MHz band during the non-contact charging, the display controller 19 displays the information 19a (and also the information 19c).

Variations of Display

In the example described above, making a call during the non-contact charging is used as a trigger to display the information 19a (and also the information 19c). Alternatively, the display controller 19 may display the information 19a, using implementation of the non-contact charging as a trigger. Even in this case, the user is able to recognize interruption or suppression of the charging during a voice call.

However, the display of the information 19a using the implementation of the non-contact charging as a trigger may possibly impair a display screen that is displayed on the display 20 at the time of starting the non-contact charging. In view of this, the display controller 19 may display the information 19a (and also the information 19c), using a predetermined operation made by a user during the non-contact charging as a trigger. This predetermined operation may be any suitable operation. For example, when a picture indicating that the non-contact charging is being conducted is displayed in the upper part (PICT area) of the display area 2a during the non-contact charging, an operation made on this picture may be regarded as the predetermined operation. Alternatively, upon receipt of a predetermined first operation, a screen (notification window) for describing the picture displayed in the PICT area may be displayed, and upon receipt of a second operation made on the area for describing the picture (area for describing the non-contact charging), the information 19a (and also the information 19c) may be displayed.

In this case, even if the non-contact charging is conducted, the information 19a (and also the information 19c) is not displayed unless the user performs an operation. This avoids impairment of the display screen displayed in the display area 2a at the time of starting the non-contact charging. On the other hand, the information 19a (and also the information 19c) is displayed upon the operation by the user. This enables the user to recognize that the charging could possibly be suppressed.

While the above has been a detailed description of the portable wireless terminal 1, the above description is illustrative in all aspects, and the present disclosure is not limited to the description given above. In summary, the above-described technique is applicable to any devices that includes a display and have the function of conducting non-contact charging and the function of carrying out wireless communication with external devices. For example, this technique is applicable to devices such as automobile-mounted devices and personal computers (e.g., notebook type personal computers). Embodiments and variations described above may be implemented in combination as long as there are no mutual inconsistencies. Numerous modifications and variations that are not illustrated are conceivable without departing from the scope of the present disclosure.

The invention claimed is:

1. A wireless device capable of making a call to another wireless device of a call partner, comprising:
a first coil configured to generate an induced electromotive force by linking with magnetic flux from an external second coil;
a battery configured to be supplied and charged with a charging current by the induced electromotive force;
a wireless communication unit configured to wirelessly communicate with the wireless device of the call partner;
a display;
at least one processor configured to communicate with the wireless device of the call partner via the wireless communication unit to perform call-related processing, and when a call is made during charging using the induced electromotive force, display charging information on the display, the charging information including information regarding a reduction in the charging current during the call; and
a charging connector detachably connectable to an external direct-contact battery charger,
wherein the at least one processor is configured to select one of a voltage of the charging connector and the induced, electromotive force and use the selected voltage or force to charge the battery, and
the at least one processor is configured to display charge switching information on the display when a call is made during charging using the induced electromotive force, the charge switching information being information that recommends charging using the direct-contact battery charger.

2. A wireless device capable of making a call to another wireless device of a call partner, comprising:
a first coil configured to generate an induced electromotive force by linking with magnetic flux from an external second coil;
a battery configured to be supplied and charged with a charging current by the induced electromotive force;
a wireless communication unit configured to wirelessly communicate with the wireless device of the call partner;
a display; and
at least one processor configured to communicate with the wireless device of the call partner via the wireless communication unit to perform call-related processing, and when a call is made during charging using the induced electromotive force, display charging information on the display, the charging information including information regarding a reduction in the charging current during the call, wherein the at least one processor is configured to measure a reception level of a received signal received by the wireless communication unit, and
the at least one processor is configured to, when the reception level is lower than a reference value, adjust the charging current to improve receiving sensitivity relative to receiving sensitivity for when the reception level is higher than the reference value.

3. The wireless device according to claim 2, wherein when the reception level is lower than the reference value, the at least one processor sets the charging current to zero.

4. The wireless device according to claim 3, wherein the charging information comprises information indicating a possibility of the charging being interrupted.

5. The wireless device according to claim 2, wherein the charging information comprises information indicating a possibility of the charging current being reduced.

6. The wireless device according to claim 2, wherein the at least one processor is configured to display the charging information on the display when the reception level is lower than the reference value.

7. The wireless device according to claim 6, wherein the charging information comprises information indicating that the charging current is being reduced.

8. The wireless device according to claim 2, comprising:
a charge-amount detector configured to detect an amount of charge accumulated in the battery,
wherein the at least one processor is configured to display the charging information on the display when a rate of change in the amount of charge over time is negative.

9. The wireless device according to claim 2, wherein the wireless communication unit is configured to support both a first frequency hand and a second frequency band,
a transmission band and a reception band in the first frequency band are respectively in a range of 1851.25 to 1908.75 MHz and in a range of 1931.25 to 1988.75 MHz, and a transmission hand and a reception band in the second frequency band are respectively in a range of 824.7 to 848.31 MHz and in a range of 869.7 to 893.31 MHz or respectively in a range of 817.9 to 823.1 MHz and in a range of 862.9 to 868.1 MHz,
the at least one processor is configured to adjust the charging current to a value other than zero when the reception level is lower than the reference value in the first frequency band, and to adjust the charging current to zero when the reception level is lower than the reference value in the second frequency band, and
the at least one processor is configured to hide the charging information during a call using the first frequency band and to display the charging information on the display during a call using the second frequency band.

10. The wireless device according to claim 2, wherein the at least one processor is configured to determine a transmission level of a transmission signal transmitted from the wireless communication unit so as to not exceed a maximum value, while increasing the transmission level in accordance with a request from outside, and
the at least one processor is configured to set the maximum value for when charging is conducted using the induced electromotive force to a value smaller than the maximum value for when the charging is not conducted using the induced electromotive force.

11. A method of controlling display on a display of a wireless device, the wireless device being capable of making a call to another wireless device of a call partner and comprising:
  a first coil configured to generate an induced electromotive force by linking with magnetic flux from an external second coil;
  a battery configured to be supplied and charged with a charging current by the induced electromotive force;
  a wireless communication unit; and
  a display,
the method comprising:
communicating with the wireless device of the call partner via the wireless communication Unit to perform call-related processing;
displaying charging information on the display when a call is made during charging using the induced electromotive force, the charging information including information regarding a reduction in the charging current during the call;
measuring a reception level of a received signal received by the wireless device; and
when the reception level is lower than a reference value, adjusting the charging current to improve receiving sensitivity relative to a receiving sensitivity when the reception level is higher than the reference value.

12. A non-transitory computer readable recording medium that stores a control program for controlling a wireless device, the control program causing the wireless device to execute the steps of:
communicating with a wireless device of a call partner to perform call-related processing;
generating an induced electromotive force by linking a first coil of the wireless device with magnetic flux from an external second coil and supplying a charging current to a battery of the wireless device by the induced electromotive force to charge the battery;
displaying charging information on a display of the wireless device when the call-related processing is performed during charging using the induced electromotive force, the charging information including information regarding a reduction in the charging current during a call;
measuring a reception level of a received signal received by the wireless device; and
when the reception level is lower than a reference value, adjusting the charging current to improve receiving sensitivity relative to a receiving sensitivity when the reception level is higher than the reference value.

\* \* \* \* \*